US012651454B2

(12) United States Patent
Sakamoto

(10) Patent No.: US 12,651,454 B2
(45) Date of Patent: Jun. 9, 2026

(54) IMAGE DISPLAY SYSTEM, TERMINAL, METHOD, AND PROGRAM FOR DETERMINING A DIFFERENCE BETWEEN A FIRST IMAGE AND A SECOND IMAGE

(71) Applicant: NEC Corporation, Tokyo (JP)

(72) Inventor: Shizuo Sakamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/240,467

(22) Filed: Aug. 31, 2023

(65) Prior Publication Data

US 2023/0410500 A1      Dec. 21, 2023

Related U.S. Application Data

(63) Continuation of application No. 18/140,463, filed on Apr. 27, 2023, now Pat. No. 12,333,797, which is a (Continued)

(30) Foreign Application Priority Data

Mar. 24, 2016      (JP) ................................. 2016-059612

(51) Int. Cl.
  *G06V 20/00*        (2022.01)
  *G06F 1/16*         (2006.01)
          (Continued)

(52) U.S. Cl.
  CPC ............ *G06V 20/00* (2022.01); *G06F 1/1686* (2013.01); *G06F 16/587* (2019.01); *G06V 20/20* (2022.01); *G06V 20/52* (2022.01); *H04N 23/80* (2023.01)

(58) Field of Classification Search
  None
  See application file for complete search history.

(56) References Cited

U.S. PATENT DOCUMENTS 8,509,488 B1      8/2013  Enge et al.
9,047,166 B2 *    6/2015  Nishio ...................... G06F 8/30
          (Continued)

FOREIGN PATENT DOCUMENTS

JP      2009-187233 A      8/2009
JP      2014-175733 A      9/2014
          (Continued)

OTHER PUBLICATIONS

US Office Action for U.S. Appl. No. 18/140,463, mailed on Dec. 5, 2023.

(Continued)

*Primary Examiner* — Hilina K Demeter
(74) *Attorney, Agent, or Firm* — Sughrue Mion, PLLC

(57) ABSTRACT

The present invention provides an image display system, a terminal, a method, and a program that can quickly and accurately display an image corresponding to a particular location. An image display system according to one example embodiment of the present invention includes: a current image acquisition unit configured to acquire a first image captured by a mobile terminal; an information acquisition unit configured to acquire information including a position and an orientation of the mobile terminal that has captured the first image; a past image acquisition unit configured to acquire a second image based on the position and the orientation of the mobile terminal and a position and an orientation associated with the second image stored in the past in a storage device; and a difference detection unit configured to detect a difference between the first image and the second image.

8 Claims, 18 Drawing Sheets

Related U.S. Application Data continuation of application No. 17/329,787, filed on May 25, 2021, now Pat. No. 12,039,773, which is a continuation of application No. 16/086,942, filed as application No. PCT/JP2017/011654 on Mar. 23, 2017, now abandoned.

(51) Int. Cl.

| | |
|---|---|
| *G06F 16/587* | (2019.01) |
| *G06V 20/20* | (2022.01) |
| *G06V 20/52* | (2022.01) |
| *H04N 23/80* | (2023.01) |

(56) References Cited

U.S. PATENT DOCUMENTS

| | | | | |
|---|---|---|---|---|
| 9,342,930 | B1 | 5/2016 | Kraft et al. | |
| 9,509,906 | B2 * | 11/2016 | Azami | H04N 5/772 |
| 9,620,168 | B1 | 4/2017 | Townsend et al. | |
| 9,693,050 | B1 | 6/2017 | Madhani et al. | |
| 9,729,865 | B1 | 8/2017 | Kuo | G06F 1/1686 |
| 9,804,596 | B1 | 10/2017 | Slavin | |
| 10,007,861 | B1 | 6/2018 | Maurer et al. | |
| 10,235,769 | B2 | 3/2019 | Houri | |
| 10,237,518 | B2 | 3/2019 | Kuroda | |
| 10,777,097 | B2 | 9/2020 | Kanuganti et al. | |
| 2006/0007311 | A1 | 1/2006 | Watanabe | |
| 2006/0192660 | A1 | 8/2006 | Watanabe et al. | |
| 2007/0030363 | A1 | 2/2007 | Cheatle et al. | |
| 2008/0137912 | A1 | 6/2008 | Kim et al. | |
| 2008/0268876 | A1 | 10/2008 | Gelfand et al. | |
| 2008/0292140 | A1 | 11/2008 | Morris et al. | |
| 2009/0157268 | A1 | 6/2009 | Chiba et al. | |
| 2010/0191459 | A1 * | 7/2010 | Carter | G06F 16/444 |
| | | | | 348/222.1 |
| 2011/0069863 | A1 | 3/2011 | Ito | |
| 2011/0312374 | A1 | 12/2011 | Chen et al. | |
| 2012/0099012 | A1 | 4/2012 | Ryu et al. | |
| 2012/0120103 | A1 | 5/2012 | Border et al. | |
| 2013/0201182 | A1 | 8/2013 | Kuroki et al. | |
| 2014/0016821 | A1 | 1/2014 | Arth et al. | |
| 2014/0168033 | A1 | 6/2014 | Zou et al. | |
| 2015/0002536 | A1 | 1/2015 | Mendis | G09G 5/40 |
| | | | | 345/619 |
| 2015/0116314 | A1 * | 4/2015 | Saito | G06F 3/14 |
| | | | | 345/419 |
| 2015/0121242 | A1 * | 4/2015 | Kwon | G06F 16/48 |
| | | | | 715/739 |
| 2015/0310617 | A1 * | 10/2015 | Hara | G06T 7/80 |
| | | | | 345/633 |
| 2015/0363074 | A1 * | 12/2015 | Tsai | G06F 16/587 |
| | | | | 715/747 |
| 2016/0005229 | A1 * | 1/2016 | Lee | G06T 11/60 |
| | | | | 345/419 |
| 2016/0019223 | A1 | 1/2016 | Kisielius et al. | |
| 2016/0034784 | A1 | 2/2016 | Ohmura | |
| 2016/0061623 | A1 | 3/2016 | Pahwa | |
| 2016/0069703 | A1 | 3/2016 | Nakano | |
| 2016/0073081 | A1 | 3/2016 | Becker et al. | |
| 2016/0148417 | A1 | 5/2016 | Kim et al. | |
| 2016/0212358 | A1 | 7/2016 | Shikata | |
| 2017/0150118 | A1 | 5/2017 | Pacheco | |
| 2017/0200293 | A1 | 7/2017 | Solem | H04N 7/185 |
| 2017/0311037 | A1 | 10/2017 | Ohmura et al. | |
| 2017/0345194 | A1 | 11/2017 | Park et al. | |

FOREIGN PATENT DOCUMENTS

| | | |
|---|---|---|
| JP | 2015-26105 A | 2/2015 |
| JP | 2016-18463 A | 2/2016 |
| WO | 2016/001321 A1 | 1/2016 |

OTHER PUBLICATIONS

US Office Action for U.S. Appl. No. 18/140,463, mailed on Mar. 20, 2024.

"Image Recognition Service Gaziru", NEC Corporation, Feb. 29, 2016, 2 pgs., <URL: http://jpn.nec.com/solution/cloud/gazou/pdf/GAZIRU.pdf>.

"Quasi-Zenith Satellites System User Interface Specification," Japan Aerospace Exploration Agency, Nov. 28, 2014, pp. A1-A12, <URL: http://qz-vision.jaxa.jp/USE/is-qzss/DOCS/IS-QZSS_16_J.pdf>.

Communication dated Oct. 24, 2019 from the European Patent Office in counterpart European Application No. 17770328.7.

Communication dated Sep. 12, 2019, from the European Patent Office in counterpart European Application No. 17770328.7.

Guofeng Tong, et al., "Locating Objects in Spherical Panoramic Images", Proceedings of the 2011 IEEE International Conference on Robotics and Biomimetics, Dec. 7, 2011, pp. 818-823 (6 pages total).

International Search Report for PCT/JP2017/011654 dated, Jun. 20, 2017 (PCT/ISA/210).

Masroor Hussain, et al. "Change detection from remotely sensed images: From pixel-based to object-based approaches", ISPRS Journal of Photogrammetry and Remote Sensing, Jun. 1, 2013, vol. 80, pp. 91-106 (16 pages total).

Michael Kroepfi, et al., "Efficiently Locating Photographs in Many Panoramas", Advances in Geographic Information Systems, Jan. 1, 2010, pp. 119-128 (10 pages total).

Communication dated Jun. 21, 2023 issued by the United States Patent Office for U.S. Appl. No. 17/329,787.

US Office Action for U.S. Appl. No. 17/329,787, mailed on Nov. 28, 2023.

US Notice of Allowance for U.S. Appl. No. 17/329,787, mailed on Mar. 6, 2024.

US Office Action for U.S. Appl. No. 18/140,463, mailed on Aug. 26, 2024.

Chen Feng et al., "Augmented Reality Markers as Spatial Indices for Indoor Mobile AECFM Applications" (Year: 2012).

US Office Action for U.S. Appl. No. 18/237,707, mailed on Sep. 23, 2024.

US Office Action for U.S. Appl. No. 18/239,546, mailed on Jul. 3, 2024.

US Notice of Allowance for U.S. Appl. No. 18/140,463, mailed on Jan. 28, 2025.

US Office Action for U.S. Appl. No. 18/239,546, mailed on Dec. 12, 2024.

US Notice of Allowance for U.S. Appl. No. 18/237,707, mailed on Mar. 7, 2025.

US Office Action for U.S. Appl. No. 18/237,707, mailed on Jul. 10, 2025.

US Office Action for U.S. Appl. No. 18/239,546, mailed on May 6, 2025.

* cited by examiner

IMAGE DISPLAY SYSTEM, TERMINAL, METHOD, AND PROGRAM FOR DETERMINING A DIFFERENCE BETWEEN A FIRST IMAGE AND A SECOND IMAGE

CROSS REFERENCE TO RELATED APPLICATIONS

This application is a continuation of U.S. application Ser. No. 18/140,463 filed Apr. 27, 2023, which is a continuation of U.S. application Ser. No. 17/329,787 filed May 25, 2021, which is a continuation of U.S. application Ser. No. 16/086, 942 filed Sep. 20, 2018, which is a National Stage of International Application No. PCT/JP2017/011654 filed Mar. 23, 2017, claiming priority based on Japanese Patent Application No. 2016-059612, filed Mar. 24, 2016, the disclosure of which is incorporated herein in its entirety by reference.

TECHNICAL FIELD

The present invention relates to an image display system, a terminal, a method, and a program that display an image captured in the past at a particular location.

BACKGROUND ART

In security of an area, detection of a suspicious object is performed. A suspicious object may be an explosive or a toxic substance, for example, which is basically an object which is not usually placed at the place. Thus, detection of a suspicious object requires determination as to whether or not the object is usually placed.

In particular, in security of an important event, surveys are performed over multiple times, and the personnel may be different for each survey. For example, in security of an important person, personnel who perform a survey in advance on a planned route and personnel who perform safety check immediately before the important person passes by are often different in actual practice. It is difficult to report all, to the personnel who perform check immediately before an important person passes by, whether or not it is an object that has been confirmed to be usually placed. Thus, when a suspicious object has been placed after the previous survey, the personnel who check immediately before the important person passes by may not notice the suspicious object or may overreact to the object and take time for check even though it is not a suspicious object.

For example, it may be possible to capture and accumulate various places as images in advance in a prior survey, compare the images with the current landscape in the prior survey, and thereby examine whether or not an object which was not present in the prior survey increases in the current landscape. In this case, such a technology is required that stores and provides many images captured in the prior survey in association with capturing places.

In the art disclosed in Patent Literature 1, images associated with position information indicating capturing places are accumulated on a server, and the server selects an image close to the current position or a position designated by a user out of the accumulated images to display the image on a display of a mobile terminal.

CITATION LIST

Patent Literature

PTL 1: Japanese Patent Application Laid-Open No. 2009-187233

Non Patent Literature

NPL 1: "Quasi-Zenith Satellites System User Interface Specification," [online], Nov. 28, 2014, Japan Aerospace Exploration Agency, [searched on Feb. 25, 2016], Internet <URL: http://qz-vision.jaxa.jp/USE/is-qzss/DOCS/IS-QZSS 16 J.pdf>, p.A1-A12

NPL 2: "Image Recognition Service "GAZIRU" [online], NEC Corporation, [searched on Feb. 29, 2016], Internet <URL: http://jpn.nec.com/solution/cloud/gazou/pdf/GAZIRU.pdf>

SUMMARY OF INVENTION

Since the art disclosed in Patent Literature 1 only displays an image captured at a position close to the current position or a designated position, however, it is not to display an image in which a particular place (landscape) is captured. That is, an image acquired based only on a position may include a plurality of images in which all the directions are captured from the position. It takes much time to search many images acquired based only on a position for an image in which a particular place is captured. In security performed in a wide range, since it is demanded to reduce time taken at one place, it is difficult to use the art disclosed in Patent Literature 1 for security including detection of a suspicious object.

The present invention has been made in view of the above problem and intends to provide an image display system, a terminal, a method, and a program that can quickly and accurately display an image corresponding to a particular place.

The first example aspect of the present invention is an image display system including: a first image acquisition unit configured to acquire a first image captured by a mobile terminal; an information acquisition unit configured to acquire information including a position and an orientation of the mobile terminal that has captured the first image; a second image acquisition unit configured to, based on the position and the orientation of the mobile terminal and a position and an orientation associated with a second image stored in the past in a storage device, acquire the second image; and a difference detection unit configured to detect a difference between the first image and the second image.

The second example aspect of the present invention is a terminal including: a first image acquisition unit configured to acquire a first image captured; an information acquisition unit configured to acquire information including a position and an orientation; and a difference detection unit configured to receive a second image acquired based on the position and the orientation and a position and an orientation associated with the second image stored in the past in a storage device and detect a difference between the first image and the second image.

The third example aspect of the present invention is a method including: acquiring a first image captured by a mobile terminal; acquiring information including a position and an orientation of the mobile terminal that has captured the first image; based on the position and the orientation of the mobile terminal and a position and an orientation associated with a second image stored in the past in a storage device, acquiring the second image; and detecting a difference between the first image and the second image.

The fourth example aspect of the present invention is a program configured to cause a computer to execute: acquiring a first image captured by a mobile terminal; acquiring information including a position and an orientation of the mobile terminal that has captured the first image; based on the position and the orientation of the mobile terminal and a position and an orientation associated with a second image stored in the past in a storage device, acquiring the second image; and detecting a difference between the first image and the second image.

Advantageous Effects of Invention

According to the present invention, since an image stored in the past is acquired based on the position and the orientation of a mobile terminal that has captured a first image, it is possible to easily acquire and display a second image corresponding to a particular place which the user having the mobile terminal faces.

DESCRIPTION OF EMBODIMENTS

Figure 1:
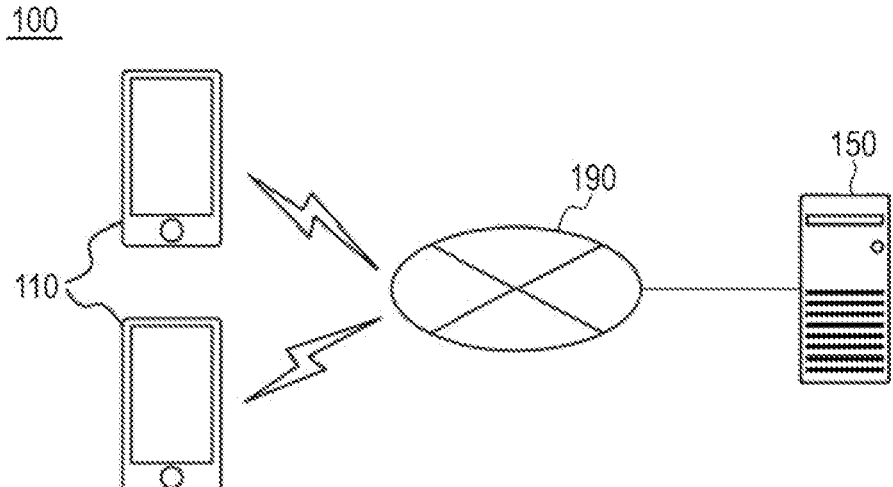
FIG. 1 is a schematic diagram of an image display system according to a first example embodiment.

While example embodiments of the present invention will be described below with reference to the drawings, the present invention is not limited to the present example embodiments. Note that, in the drawings described below, components having the same function are labeled with the same references, and the duplicated description thereof may be omitted.

First Example Embodiment

FIG. 1 is a schematic diagram of an image display system 100 according to the present example embodiment. The image display system 100 has a mobile terminal 110 and a server 150. The mobile terminal 110 and the server 150 are connected to each other via wired connection or wireless connection via a network 190 such as the Internet. The image display system 100 may include devices such as another server, another mobile terminal, or the like. The mobile terminal 110 is a terminal that is carried by a customer and has an image capture function using a camera and a function of displaying an image acquired from the server 150. The server 150 is a server that is installed at any location and performs storage and acquisition of an image.

Figure 2:
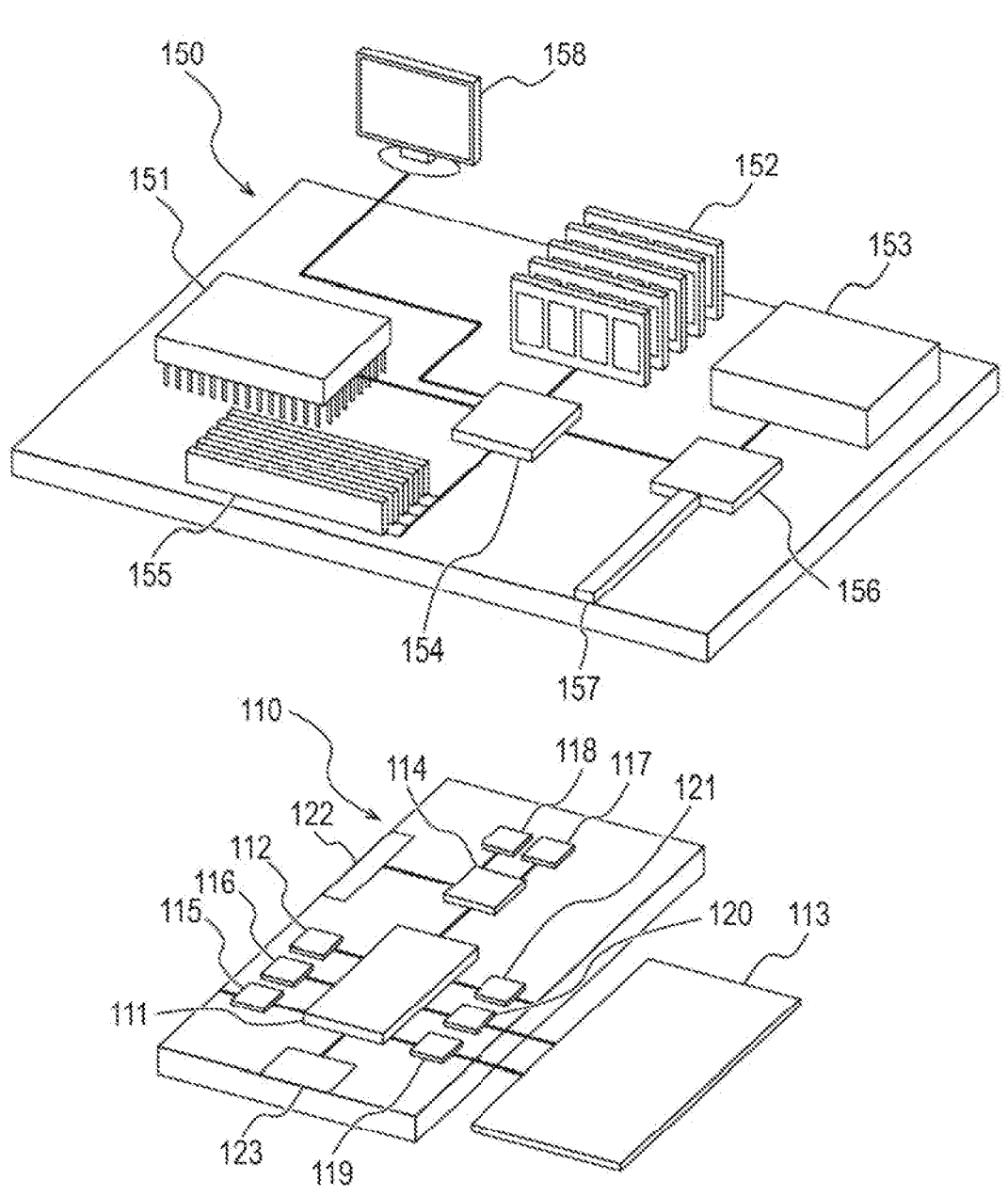
FIG. 2 is a general configuration diagram of a mobile terminal and a server according to the first example embodiment.

FIG. 2 is a general configuration diagram of the mobile terminal 110 and the server 150 according to the present example embodiment. Note that each of the mobile terminal 110 and the server 150 may be formed of a single device or may be formed of two or more physically separated devices in wired connection or wireless connection. For example, the server 150 is a laptop computer, a desktop computer, a workstation, a personal digital assistant, a server, a blade server, a mainframe, an embedded system, or the like. For example, the mobile terminal 110 is a personal digital assistant, a mobile phone, a smartphone, or the like. The specific hardware configuration of the mobile terminal 110 and the server 150 is not limited to the following configuration, and may be of various types or forms.

The server 150 has a processor 151, memory 152, and a storage device 153. Further, the server 150 has a high-speed controller 154 including a high-speed interface and a low-speed controller 156 including a low-speed interface. The memory 152 and a high-speed expansion port 155 are connected to the high-speed controller 154. Further, a display device such as a display 158 or the like is connected to the high-speed controller 154. On the other hand, a low-speed expansion port 157 and a storage device 153 are connected to the low-speed controller 156.

The processor 151, the memory 152, the storage device 153, and the high-speed controller 154, the low-speed controller 156, and the high-speed expansion port 155 are connected to each other through various buses. Further, the processor 151, the memory 152, the storage device 153, the high-speed controller 154, the low-speed controller 156, the high-speed expansion port 155, and the low-speed expansion port 157 may be implemented on a common motherboard or may be implemented in other forms as appropriate.

The processor 151 is a central processing unit (CPU), for example, and is able to process instructions executed within the server 150. Such instructions include an instruction that is used for displaying graphics information of a graphical user interface (GUI) on a display device such as the display 158 and stored in the memory 152 or the storage device 153.

Further, a plurality of processors, a plurality of busses, or a plurality of processors and a plurality of busses can be used as appropriate together with a plurality of memory devices and multiple types of memory devices. Further, a plurality of servers 150 can be connected to each device that performs a part of the necessary process. For example, a plurality of servers 150 can be connected to each other as a server bank, a group of blade servers, or a multiprocessor system.

The memory 152 stores therein information within the server 150. For example, the memory 152 may be a volatile memory unit or a non-volatile memory unit. The memory 152 may be another computer readable storage medium, such as a magnetic disk, an optical disk, or the like, for example.

The storage device 153 can configure mass storage used for the server 150. The storage device 153 may be, for example, a computer readable storage medium such as a floppy (registered trademark) disk device, a hard disk device, an optical disk device, a tape device, a solid state memory device such as a flash memory, a disk array, or the like or may include such a computer readable storage medium. The storage device 153 may be a storage area network or a device with another configuration.

The high-speed controller 154 manages processes in which the bandwidth for the server 150 is intensively used. On the other hand, the low-speed controller 156 manages processes in which the bandwidth is less intensively used. However, such allocation of the functions is a mere example, and allocation is not limited thereto. Further, a part or a whole of the high-speed controller 154 may be incorporated in the processor 151.

The high-speed controller 154 is connected to the high-speed expansion port 155 that can accept the memory 152 and various expansion cards. Further, the high-speed controller 154 is connected to the display 158 via a graphics processor or an accelerator, for example.

The low-speed controller 156 is connected to the storage device 153 and the low-speed expansion port 157. The low-speed expansion port 157 can include, for example, a communication port of various standards such as Universal Serial Bus (USB), Bluetooth (registered trademark), wired or wireless Ethernet (registered trademark), or the like. One or plurality of input/output devices such as a keyboard, a pointing device, a scanner, or the like can be connected to the low-speed expansion port 157. Further, one or plurality of network devices such as a switch, a router, or the like can be connected to the low-speed expansion port 157 via a network adapter, for example. That is, the low-speed expansion port 157 functions as a communication interface.

The server 150 can be implemented in many forms without being limited to the forms described above. For example, the server 150 can be implemented in a form of a typical server or a plurality of servers in a form of a group of such servers. Further, the server 150 can be implemented as a part of the rack server system. Furthermore, the server 150 can be implemented in a form of a personal computer such as a laptop computer, a desktop computer, or the like.

Note that a part or a whole of the program executed by the processor 151 of the server 150 can be provided by a computer readable storage medium storing the above, such as a digital versatile disc-read only memory (DVD-ROM), a compact disc-read only memory (CD-ROM), a USB memory, or a flash memory.

The mobile terminal 110 has a processor 111, memory 112, a display 113, a communication interface 114, a camera 115, and an electronic compass 116. The mobile terminal 110 may have a storage device such as a micro drive, a flash memory, or the like as additional storage. Respective components of the mobile terminal 110 are connected to each other using various busses. At least some of the components of the mobile terminal 110 may be attached on a common motherboard or may be attached by other ways.

The processor 111 can execute instructions residing in the mobile terminal 110 including instructions stored in the memory 112. The processor 111 may be implemented as a chip or a chipset having one or a plurality of analog or digital processors. The processor 111 controls other components of the mobile terminal 110 and performs display of a user interface, execution of an application, wireless communication, or the like, for example.

The processor 111 can perform input/output of information to a user through a display interface 119 and an input interface 120 connected to the display 113. As a display 113, any display unit such as a liquid crystal display, an organic electro luminescence (EL) display, or the like may be used, for example. The display interface 119 has a circuit necessary for driving the display 113 so as to present an image and other information to the user. Further, the display 113 is configured as a touch panel and outputs a user operation as an electric signal. The input interface 120 accepts an electric signal indicating a user operation on the display 113 and converts it for transmission to the processor 111.

The memory 112 stores therein information within the mobile terminal 110. The memory 112 is a computer readable storage medium, a volatile memory unit, a non-volatile memory unit, or a combination thereof, for example. As the memory 112, a flash memory, a non-volatile random access memory (NVRAM), or the like may be used, for example.

The camera 115 is an image capturing unit that outputs a resulted captured image as digital data. As the camera 115, any image capturing device such as a charge coupled device (CCD) camera, a complementary metal oxide semiconductor (CMOS) camera, or the like may be used. The camera 115 includes an image capturing element, an electric circuit, a lens, and the like necessary for image capturing.

The electronic compass 116 is an orientation acquisition unit that acquires the orientation of the mobile terminal 110. As the electronic compass 116, any device such as a terrestrial magnetism that is capable of acquiring the orientation of the mobile terminal 110 may be used.

The communication interface 114 is connected to a Global Positioning System (GPS) receiver 117 and a mobile communication device 118. The mobile communication device 118 performs mobile communication using any mode or protocol including a voice communication with Global System for Mobile communication (GSM) (registered trademark) scheme or the like, messaging such as Short Message Service (SMS), and data communication with Code Division Multiple Access (CDMA) scheme or the like. The mobile communication device 118 includes a processor, an electric circuit, an antenna, and the like necessary for mobile communication.

The GPS receiver 117 is a position acquisition unit that acquires the position of the mobile terminal 110. The GPS receiver 117 includes a processor, an electric circuit, an antenna, and the like necessary for receiving the position of the mobile terminal 110 from the GPS. While the coordinates (x-coordinate and y-coordinate with a predetermined location being the origin) in the horizontal direction in a plan map display are used as a position for simplicity in the present example embodiment, any positional expression such as a latitude and a longitude may be used instead thereof. Furthermore, a height may be used as a position in addition to the coordinates in the horizontal direction. A height (altitude) can be calculated based on a GPS signal. This allows for distinction of a position in the height direction (for example, a level within a building), which makes it possible to acquire an image that is different for respective heights in addition to the horizontal direction coordinates in the image display method described below.

Since a position is calculated based on a signal from a satellite in the GPS, the position may not be acquired inside a building. Thus, a positioning technology utilizing Indoor MEssaging System (IMES) (Non Patent Literature 1), a wireless Local Area Network (LAN), or the like that acquires a position by receiving a signal of position information transmitted from a transmitter provided on the land may be used instead of or in addition to the GPS.

The mobile terminal 110 can perform communication by voice using an audio interface 121. The audio interface 121 is connected to a microphone and a speaker. The audio interface 121 accepts speech information from the user through the microphone and converts it into digital information which can be processed by the processor 111. Further, the audio interface 121 can generates an audible sound to the user through the speaker, for example. A sound output by the audio interface 121 includes a voice from a voice call, a sound recorded in the memory 112 (for example, a voice message, a music file, or the like), or a sound generated by an application running on the mobile terminal 110.

The mobile terminal 110 is provided with an expansion interface 122 and an external interface 123. The expansion interface 122 is connected to expansion memory, for example. The expansion memory functions as additional storage to the mobile terminal 110 and may store a program running on the mobile terminal 110 or other information. Further, the expansion memory may store secure information and, in this case, functions as a security module.

The external interface 123 is configured to communicate with the processor 111 and can perform wired communication or wireless communication. For example, the external interface 123 performs near field communication such as Bluetooth (registered trademark) or wireless communication such as wireless LAN between the mobile terminal 110 and other devices. As the external interface 123, a plurality of interfaces may be combined and used.

Figure 3:
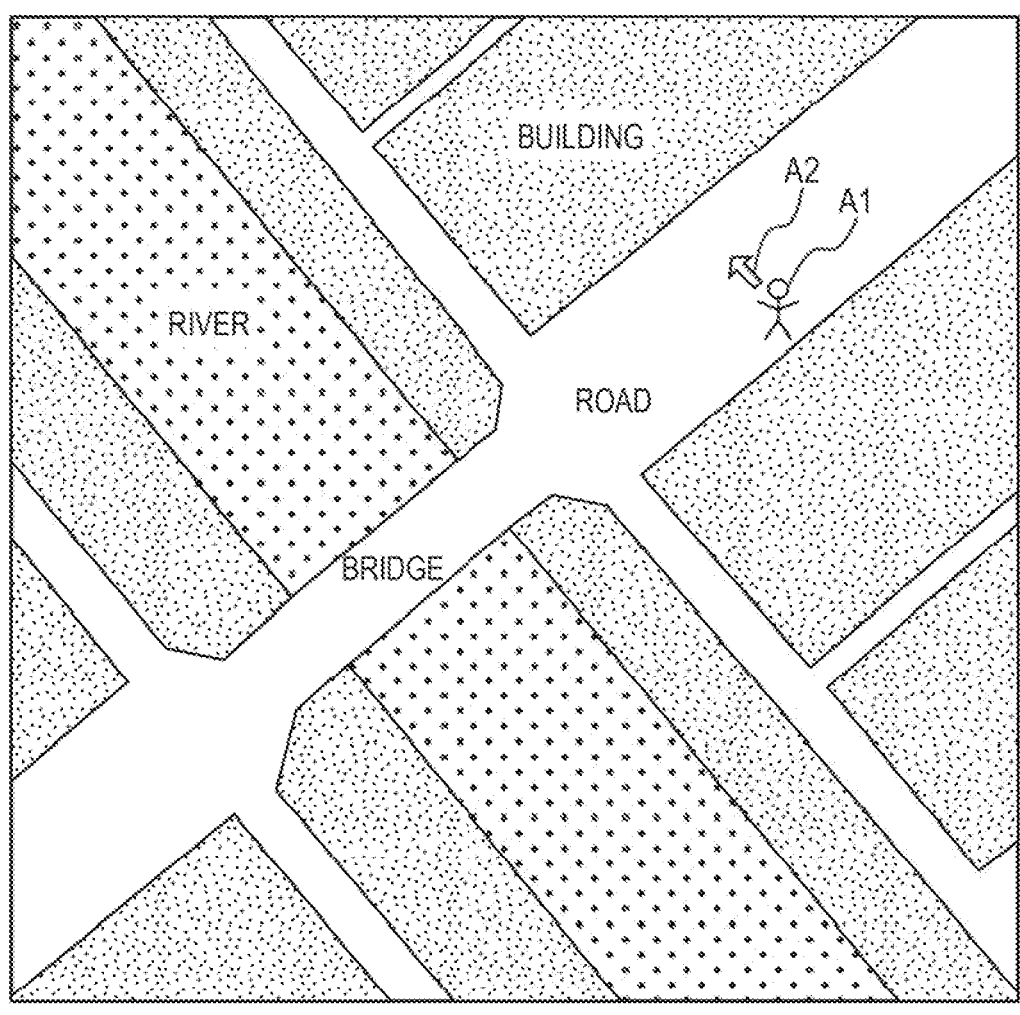
FIG. 3 is a schematic diagram illustrating a position of a user having the mobile terminal according to the first example embodiment.

FIG. 3 is a schematic diagram illustrating the position of a user having the mobile terminal 110. The user directs the camera 115 of the mobile terminal 110 to a particular orientation A2 at a position A1. In this state, the mobile terminal 110 sequentially displays the image captured by the camera 115 (referred to as a current image or a first image) on the display 113. Since the user usually holds the camera 115 in front thereof to capture an image, an image captured range of the current image corresponds to a current field of view of the user having the mobile terminal 110. In the following, the position and the orientation of the mobile terminal 110 in a state where the user holds the camera 115 in front thereof are referred to as a current position and a current orientation of the mobile terminal 110. Further, in response to the user performing a predetermined operation with the mobile terminal 110, the mobile terminal 110 displays an image including a place captured in the past which is similar to the current image (referred to as a past image or a second image) on the display 113.

Figure 4:
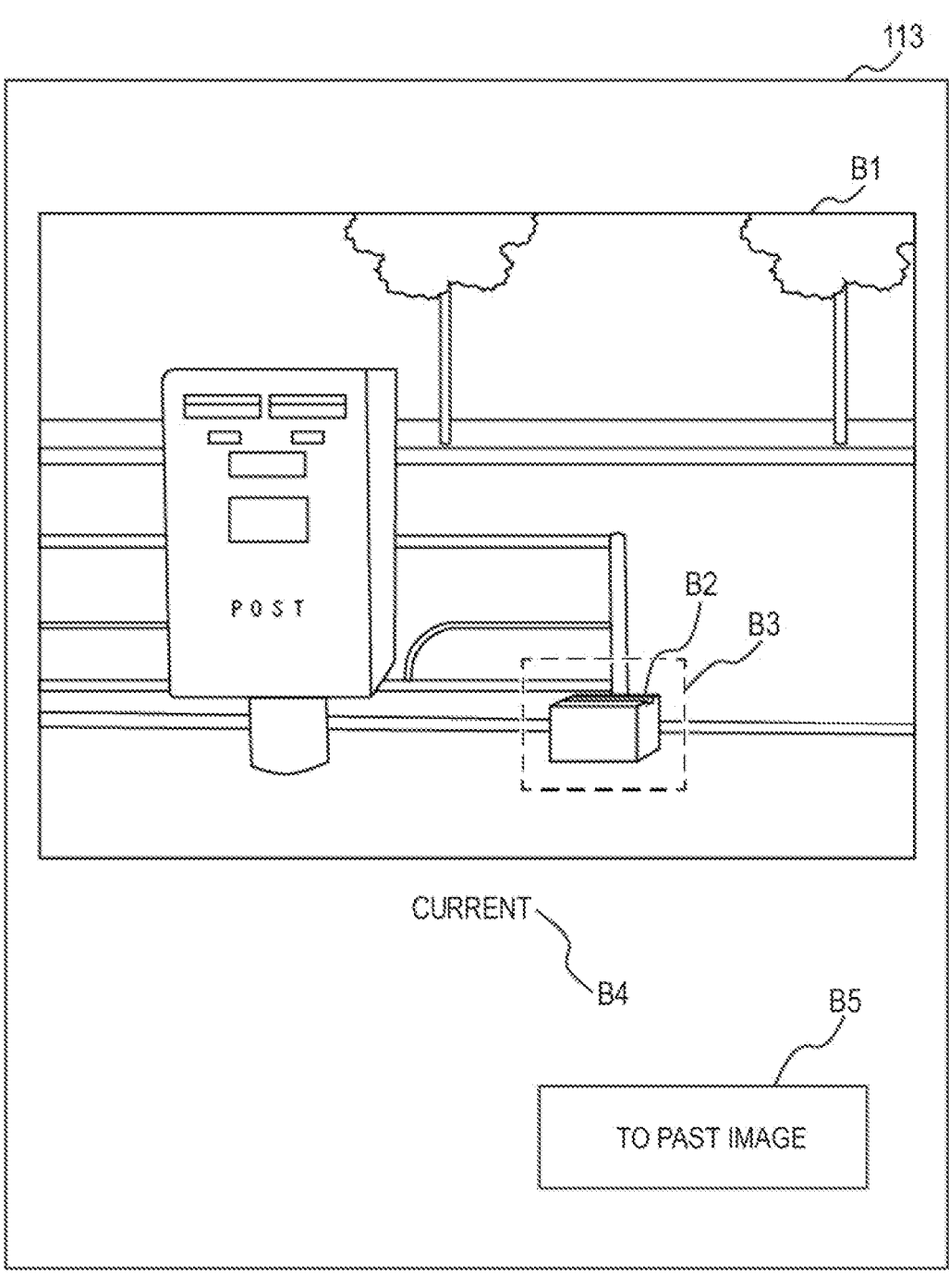
FIG. 4 is a front view of a display of the mobile terminal displaying a current image.

FIG. 4 is a front view of the display 113 of the mobile terminal 110 displaying a current image B1. Upon startup of an image display program according to the present example embodiment, the mobile terminal 110 enters a state of displaying the current image on the display 113 as illustrated in FIG. 4. The display 113 displays the current image B1, a text B4 indicating that it is the current image, and a button B5 used for displaying the past image.

The current image B1 is an image captured by the camera 115. For example, an image of an object B2 is included within the current image B1. A frame B3 indicating a difference from a past image in which a similar place is captured is further included in the current image B1. A method of detection of the difference between the current image and the past image will be described later. In the example of FIG. 4, since the object B2 is not included in the past image (FIG. 5) and thus detected as a difference, the frame B3 surrounding a region including the object B2 is displayed.

The button B5 is a virtual button displayed on the display 113 and can be pressed by the user operating a touch panel or the like. In response to the button B5 being pressed by the user, the mobile terminal 110 transfers to a state where the past image is displayed on the display 113 as illustrated in FIG. 5.

Figure 5:
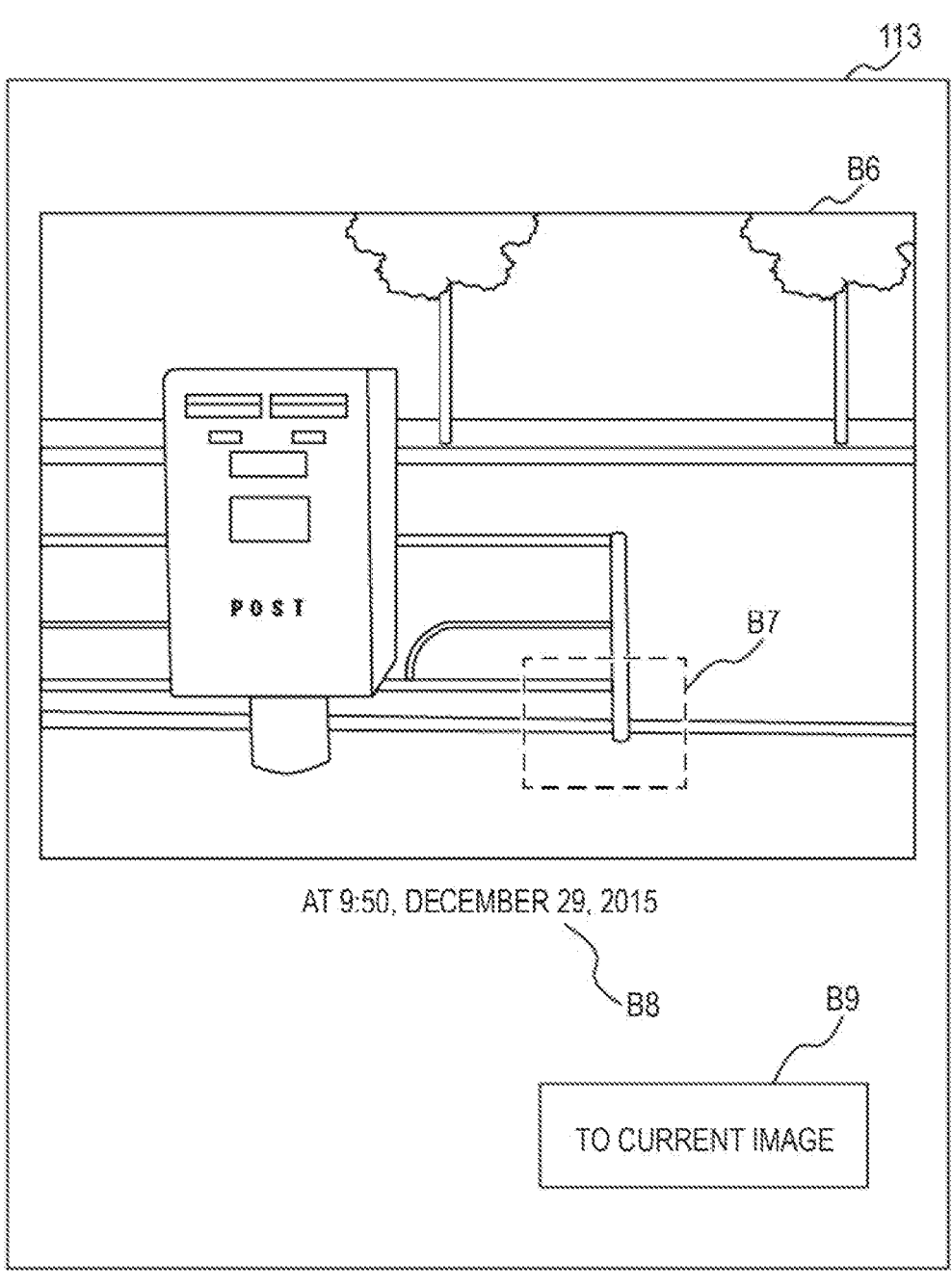
FIG. 5 is a front view of a display of the mobile terminal displaying a past image.

FIG. 5 is a front view of the display 113 of the mobile terminal 110 displaying the past image B6. The display 113 displays a past image B6, a text B8 indicating capturing time of the past image B6, and a button B9 used for displaying the current image.

The past image B6 is a past image received from the server 150 and associated with the position and orientation similar to the current position and orientation. A selection method of the past image B6 will be described later. The text B8 indicating capturing time of the past image B6 is received from the server 150 together with the past image B6.

A frame B7 indicating a difference from the current image is included within the past image B6. The frame B7 of the past image B6 is displayed at a position corresponding to the frame B3 in the current image B1. In comparison between the current image B1 and the past image B6 in which the difference thereof is emphasized in such a way, the user can determine that the object B2 in the current image B1 is newly arranged and is likely to be a suspicious object.

The button B9 is a virtual button displayed on the display 113 and can be pressed by the user operating the touch panel or the like. In response to the button B9 being pressed by the user, the mobile terminal 110 transfers to a state of displaying the current image on the display 113 as illustrated in FIG. 4.

Figure 6:
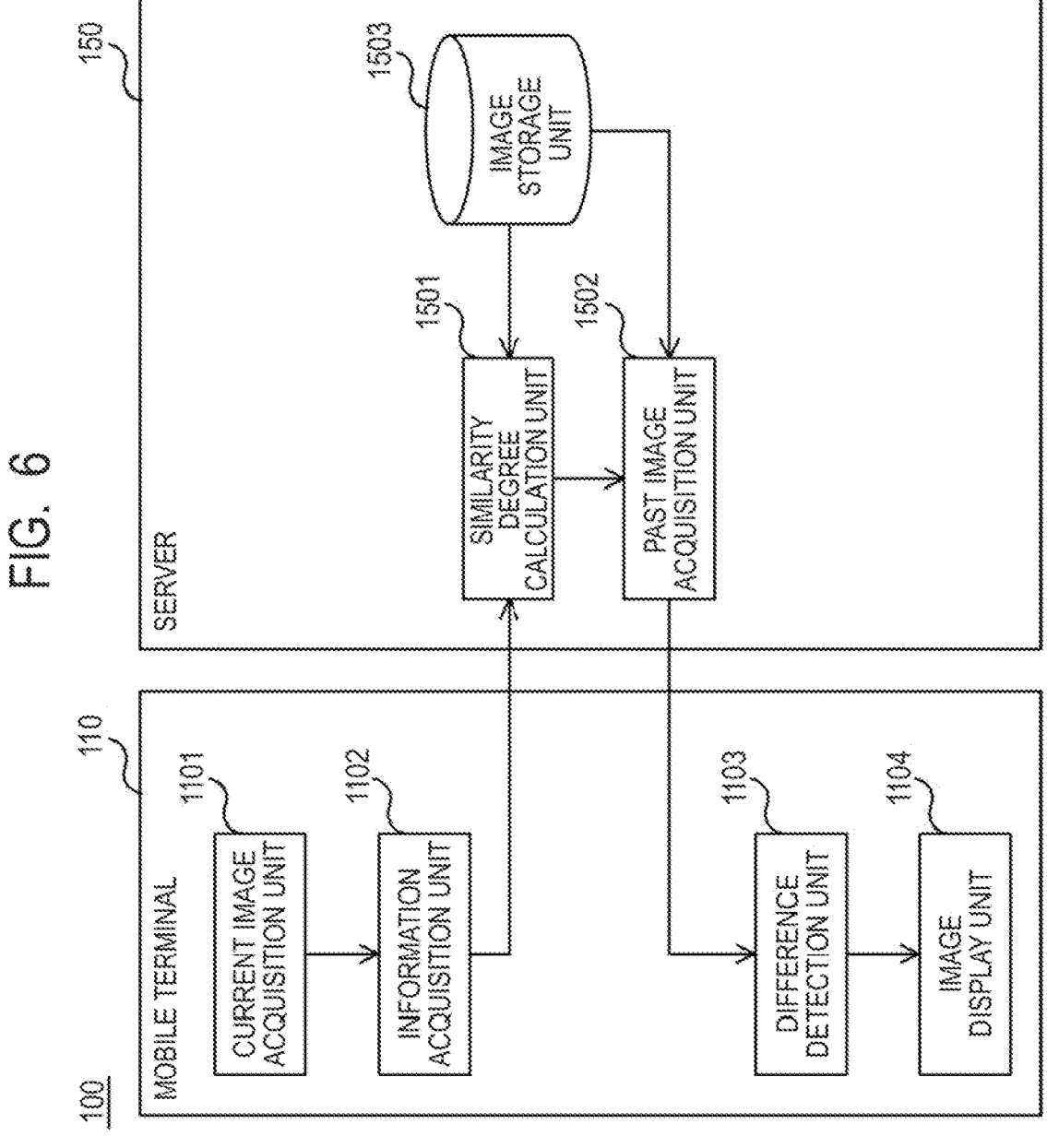
FIG. 6 is a block diagram of an image display system according to the first example embodiment.

FIG. 6 is a block diagram of the image display system 100 according to the present example embodiment. In FIG. 6, arrows represent main dataflows, and there may be other dataflows than those illustrated in FIG. 6. In FIG. 6, each block illustrates a configuration in a unit of function rather than in a unit of hardware (device).

The mobile terminal 110 has a current image acquisition unit 1101, an information acquisition unit 1102, a difference detection unit 1103, and an image display unit 1104. In the mobile terminal 110, the current image acquisition unit 1101, the information acquisition unit 1102, the difference detection unit 1103, and the image display unit 1104 are stored in the memory 112 as programs that can be executed by the processor 111, respectively. That is, in execution of the image display method according to the present example embodiment, the processor 111 functions as the current image acquisition unit 1101, the information acquisition unit 1102, the difference detection unit 1103, and the image display unit 1104. At least a part of these functions may be implemented as an electric circuit instead of a program.

The server 150 has a similarity degree calculation unit 1501, a past image acquisition unit 1502, and an image storage unit 1503. In the server 150, the similarity degree calculation unit 1501 and the past image acquisition unit

1502 are stored in the memory 152 or the storage device 153 as programs that can be executed by the processor 151. Further, the image storage unit 1503 is a part of the memory 152 or the storage device 153. That is, in execution of the image display method according to the present example embodiment, the processor 151 functions as the similarity degree calculation unit 1501 and the past image acquisition unit 1502, and the memory 152 or the storage device 153 functions as the image storage unit 1503. At least a part of these functions may be implemented as an electric circuit instead of a program.

In response to a program of the image display method according to the present example embodiment being executed by the user, the current image acquisition unit 1101 (first image acquisition unit) captures a current image by using the camera 115 and stores the captured image in the memory 112.

The information acquisition unit 1102 acquires the current position of the mobile terminal 110, that is, the position at the time of acquisition of the current image by using the GPS receiver 117. In the present example embodiment, for simplicity, the coordinates in the horizontal direction in a plan map display (x-coordinate and y-coordinate about a predetermined location as the origin) are used as a position. Alternatively, any positional expression such as a latitude and a longitude may be used as a position. Furthermore, a height may be used as a position in addition to the coordinates in the horizontal direction. At the same time, the information acquisition unit 1102 acquires the current orientation of the mobile terminal 110, that is, the orientation at the time of acquisition of the current image by using the electronic compass 116. An orientation is a direction in which the camera 115 captures an image. In the present example embodiment, for simplicity, an angle in the direction horizontal to the ground (azimuth angle) is used as an orientation. In addition to an azimuth angle, an angle of the direction perpendicular to the ground (elevation/depression angle) may be used as an orientation. Then, the information acquisition unit 1102 uses the mobile communication device 118 to transmit information including the acquired current position and orientation to the server 150. The information acquisition unit 1102 acquires the current position and orientation every predetermined time (for example, every 1 second) and transmits information including the acquired current position and orientation to the server 150 successively or at the timing of a change in the current position and orientation.

The image storage unit 1503 pre-stores past images and the positions and the orientations of the captured ranges of the past images. In the following, a position and an orientation of a captured range of a past image are simply referred to as a portion and an orientation of a past image. The image storage unit 1503 stores past images as image files that are electronic data. Each past image is provided with a unique identifier (for example, a file name). The image storage unit 1503 further stores the positions and the orientations of the past images and the capturing time of the past images as a table of a database, for example, in association with the identifiers of the past images.

The similarity degree calculation unit 1501 uses the current position and orientation received from the mobile terminal 110 and the position and orientation associated with past images pre-stored in the image storage unit 1503 to calculates a similarity degree indicating the resemblance between them based on a predetermined calculation criterion.

A calculation method of a similarity degree performed by the similarity degree calculation unit 1501 will be described below. The similarity degree calculation unit 1501 calculates a similarity degree S by using Equation (1) for respective past images pre-stored in the image storage unit 1503.

[Math. 1]

$$S = \alpha(P0-P)^2 + (Q0-Q)^2 \tag{1}$$

The value P0 denotes the current orientation, and the value P denotes the orientation of a past image. The value Q0 denotes the current position, and the value Q denotes the position of the past image. The value a is a weighting factor used for adjusting weighting of the orientation and the position. Since the orientation is expressed by an azimuth angle in the present example embodiment, the values P0 and P each are an angle. Since the position is expressed by x-y coordinates in the present example embodiment, the values Q0 and Q are two-dimensional coordinates, respectively, and the item $(Q0-Q)^2$ means the square of the distance between the current position and the position of the past image.

According to Equation (1), the closer the position and orientation of a target past image to the current position and orientation of the mobile terminal 110 is, the lower the similarity degree S is. That is, the similarity degree S is an index indicating the resemblance of the position and orientation between the target past image and the mobile terminal. The definition of the similarity degree S described here is an example, and any definition that represents the resemblance between the current position and orientation and the position and orientation of a past image may be used. While a lower similarity degree S corresponds to higher resemblance in Equation (1), the similarity degree S may be defined in the opposite manner.

The similarity degree calculation unit 1501 may calculate the similarity degree S for all the past images stored in the image storage unit 1503 or may calculate the similarity degree S for some past images which satisfy a condition. For example, the amount of calculation can be reduced with only the past images having a position which has a distance to the current position of the mobile terminal 110 below a predetermined value being a calculation target.

The past image acquisition unit 1502 (second image acquisition unit) acquires, from the image storage unit 1503, a past image having the smallest similarity degree S (that is, having the highest resemblance) out of the past images whose similarity degrees S have been calculated. The past image acquisition unit 1502 then uses the communication interface to transmit the acquired past image to the mobile terminal 110.

The difference detection unit 1103 detects a difference between a current image captured by the camera 115 and a past image received from the server 150. As a detection method of a difference, a known method may be used. For example, the difference detection unit 1103 first extracts feature points of the current image and the past image, respectively, and performs positioning of the current image and the past image to each other so that the feature points match each other. As a feature point, a point (edge) in a current image and a past image at which a brightness or a color shapely changes may be used. In order to improve the accuracy of positioning, correction such as change of a color tone, an angle, a position, and a magnification may be performed in advance on the current image and the past image.

Next, the difference detection unit 1103 calculates a difference in brightness between pixels at the same position in the current image and the past image on which positioning has been performed. Out of regions having continuous pixels which have a difference in brightness value above a predetermined value, the difference detection unit 1103 then detects those having the area above a predetermined value as a difference of the current image and the past image. The difference value in brightness value used in detection of a difference and the area value may be determined by an experiment or a simulation as appropriate. The difference detection unit 1103 may detect one or a plurality of differences from a current image and a past image.

Next, a current image and a past image input to the difference detection unit 1103 are acquired based on a position and an orientation and thus are well resemble to each other. Therefore, since the difference detection unit 1103 can perform position matching and detection of a difference starting from a state where the positions and the orientations of the current image and the past image are close to each other, the difference can be accurately detected.

The difference detection unit 1103 determines each size and each position of the frame B3 displayed on the current image and the frame B7 displayed in the past image based on the size and the position of the detected difference. When the difference detection unit 1103 has performed correction such as change of an angle, a position, and a magnification on the current image and the past image in positioning, it compensates the correction and determines the size and the position of the frames B3 and B7. For example, when the current image and the past image are relatively moved because of positing, each size and each position of the frames B3 and B7 are calculated so as to indicate the difference in the current image and the past image on the current image and the past image that have not been moved.

While provided to the mobile terminal 110 in the preset example embodiment, the difference detection unit 1103 may be provided to the server 150. In this case, the server 150 transmits a difference detection result from the difference detection unit 1103 to the mobile terminal 110.

The image display unit 1104 can be in a current image display state as illustrated in FIG. 4 and a past image display state as illustrated in FIG. 5 and displays the current image or the past image on the display 113. The current image display state and the past image display state are switched by the buttons B5 and B9 on the display 113 being pressed.

In the current image display state, the image display unit 1104 displays the current image B1 acquired by the current image acquisition unit 1101 on the display 113 as illustrated in FIG. 4. At the same time, the image display unit 1104 displays the frame B3 indicating the difference determined by the difference detection unit 1103 overlapped with the current image B1. When no difference is detected by the difference detection unit 1103, the image display unit 1104 does not display the frame B3.

In the past image display state, the image display unit 1104 displays the past image B6 received from the server 150 on the display 113 as illustrated in FIG. 5. At the same time, the image display unit 1104 displays the frame B7 indicating the difference determined by the difference detection unit 1103 overlapped with the past image B6. When no difference is detected by the difference detection unit 1103, the image display unit 1104 does not display the frame B7.

A display method of the difference described above is an example, and any method that enables the user to recognize a difference may be used to display the difference. While the image display unit 1104 displays a difference in both of the current image B1 and the past image B6 in the present example embodiment, a difference may be displayed in at least one of the current image B1 and the past image B6.

The frame B3 and the frame B7 indicating a difference are not limited to the rectangular as illustrated in FIG. 4 and FIG. 5, but may be any shape such as a polygon, a circle, or the like. Instead of or in addition to the frame B3 and the frame B7 indicating a difference, the image display unit 1104 may display a difference by colors in the current image B1 or the past image B6. In this case, it is possible to display the difference by changing the color between a region including a difference and other regions, for example, by representing a region including a difference in the current image B1 or the past image B6 with color display and another region with monochrome display.

Instead of representing a frame indicating a difference in the current image B1 or the past image B6, the image display unit 1104 may display a difference by displaying only a partial region including the difference in the current image B1 or the past image B6 on the display 113.

Not only a past image stored on a position and orientation basis but also a panoramic image captured for a wider angle range may be used as a past image stored in the image storage unit 1503. A panoramic image includes an image captured with an angle range wider than a captured range of the common camera 115 at a single position or an image captured with the entire range of 360 degrees. The panoramic image is created by combining a plurality of images captured in different orientations at the same position, for example. When a panoramic image close to the current position of the mobile terminal 110 is present, the similarity degree calculation unit 1501 may select, as a past image, a part cut out from the panoramic image in a direction corresponding to the current orientation of the mobile terminal 110. Further, the similarity degree calculation unit 1501 may select the whole panoramic image as a past image. In this case, the past image display unit 1104 may display a portion in a direction corresponding to the current orientation of the mobile terminal 110 out of the received panoramic image.

By selecting a past image using not only a position but also an orientation in such a way, the mobile terminal 110 can easily display a past image corresponding to the current captured range of the camera 115 (that is, the user's field of view). Furthermore, since a current image and a past image similar to each other can be acquired based on the position and the orientation, the mobile terminal 110 can accurately detect a difference between a current image and a past image. The user can easily find a suspicious object based on the displayed difference.

Figure 7:
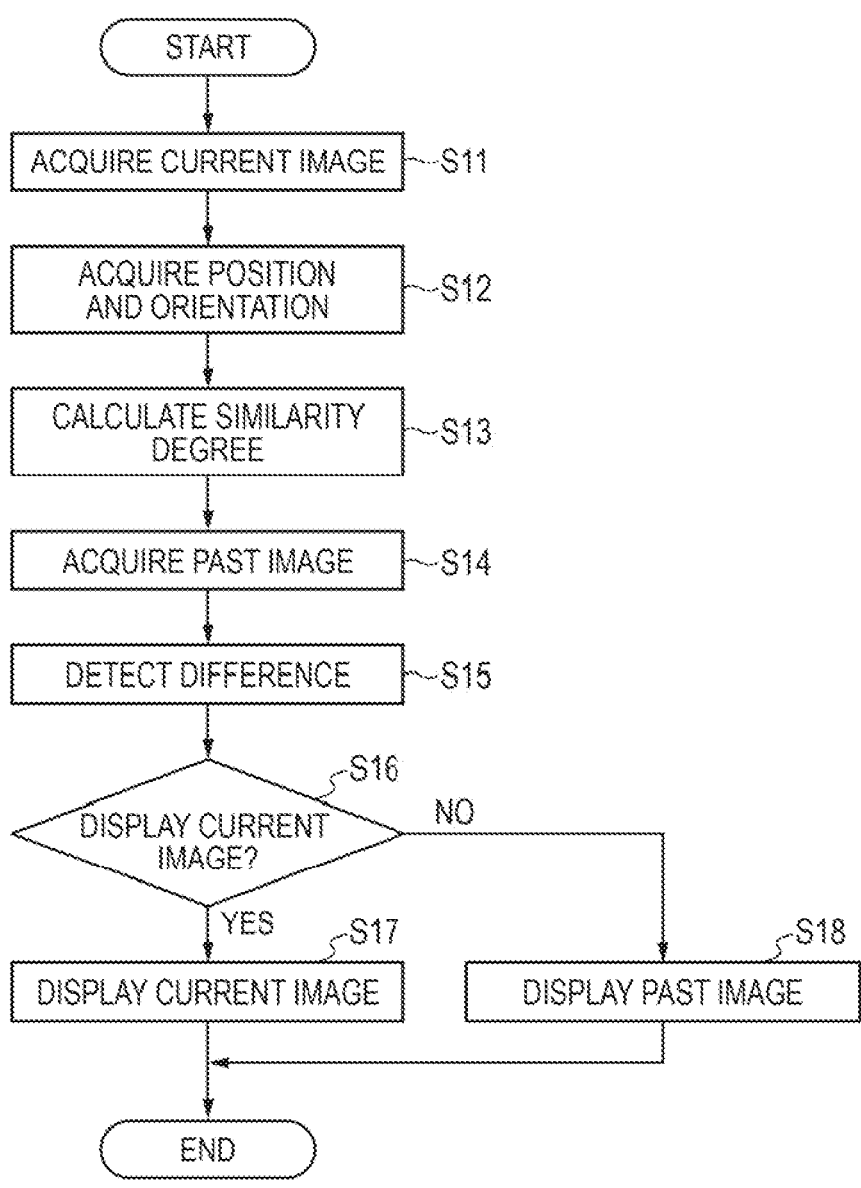
FIG. 7 is a diagram illustrating a flowchart of an image display method according to the first example embodiment.

FIG. 7 is a diagram illustrating a flowchart of an image display method according to the present example embodiment. The image display method is performed in association with the mobile terminal 110 and the server 150. The image display method is started when a predetermined operation such as pressing of a button is detected on the mobile terminal 110, for example.

First, the current image acquisition unit 1101 captures a current image using the camera 115 and stores the captured image in the memory 112 (step S11). Next, the information acquisition unit 1102 acquires the current position of the mobile terminal 110 by using the GPS receiver 117 and acquires the current orientation of the mobile terminal 110 by using the electronic compass 116 (step S12). The information acquisition unit 1102 uses the mobile communication device 118 to transmit information including the acquired current position and orientation to the server 150. The order of step S11 and step S12 may be opposite or may be performed in parallel.

The similarity degree calculation unit 1501 uses the current position and orientation received from the mobile terminal 110 to calculate the similarity degree S to each past image pre-stored in the image storage unit 1503 based on Equation (1) described above, for example (step S13).

The past image acquisition unit 1502 acquires, from the image storage unit 1503, one past image having the smallest similarity degree S out of the past images whose similarity degrees S have been calculated in step S12 (step S14). The past image acquisition unit 1502 uses the communication interface to transmit the acquired past image to the mobile terminal 110.

The difference detection unit 1103 detects a difference between the current image acquired in step S11 and the past image acquired in step S14 (step S15). A detection result of the difference from the difference detection unit 1103 includes a size and a position of a frame displayed on the current image or the past image so as to display the difference.

If a button for displaying the current image is pressed at the start of this flowchart (step S16, YES), the image display unit 1104 displays a frame indicating the difference detected in step S15 on the display 113 in addition to the current image captured by the camera 115 (step S17).

If a button for displaying the current image is not pressed at the start of this flowchart, that is, a button for displaying a past image is pressed (step S16, NO), the image display unit 1104 displays a frame indicating the difference detected in step S15 on the display 113 in addition to the past image received from the server 150 (step S18).

The processor 111 of the mobile terminal 110 and the processor 151 of the server 150 are subjects of each step (process) included in the image display method illustrated in FIG. 7. That is, the processor 111 and the processor 151 read the program for executing the image display method illustrated in FIG. 7 from the memory 112, the memory 152, or the storage device 153, execute the program to control respective units of the mobile terminal 110 and the server 150, and thereby perform the image display method illustrated in FIG. 7.

In the present example embodiment, a current image and a past image corresponding thereto may be simply displayed without detection and display of a difference. In this case, the user visually examines a difference between the current image and the past image to find a suspicious object.

According to the image display system 100 of the present example embodiment, the mobile terminal 110 can easily display a past image captured at a place similar to a current captured range of the camera 115 by only directing the camera 115. If an image is acquired by using only the position as seen in the technology disclosed in Patent Literature 1, since images captured in different directions from the same location cannot be distinguished, it is not possible to select an image corresponding to the current user's field of view. In contrast, the image display system 100 according to the present example embodiment acquires a past image by calculating a similarity degree using not only the position but also the orientation of the mobile terminal 100 and thus can display a past image corresponding to the current captured range of the camera 115, that is, the user's field of view. Furthermore, since the image display system 100 can automatically display the difference between the current image and the past image, this enables the user to easily recognize a portion having a difference between the current image and the past image.

When the image display system 100 of the present example embodiment is used for security, it is possible to easily detect a suspicious object by quickly and accurately acquiring a past image corresponding to the current user's field of view and further identifying a difference between a current state and a past state.

The image display system 100 according to the present example embodiment can be applied to tourism application without being limited to security. It is possible to provide past images of different seasons or different time for the same landscape to the user by pre-storing images of different seasons, years, and months associated with the landscape as past images. Further, it is possible to provide to the user a picture in which the landscape is drawn by pre-storing a picture (landscape painting) associated with the landscape as a past image. In this case, the position and orientation of the drawing range of a picture can be used as the position and orientation associated with the past image. As discussed above, the image display system 100 can easily and accurately display an image associated with a particular place, that is, a particular position and orientation.

Second Example Embodiment

In the present example embodiment, a position and an orientation of a pre-stored past image is displayed on a map, and a user is then notified that there is a past image close to the current position. An image display system 200 according to the present example embodiment has the same device configuration as that of the first example embodiment.

Figure 8:
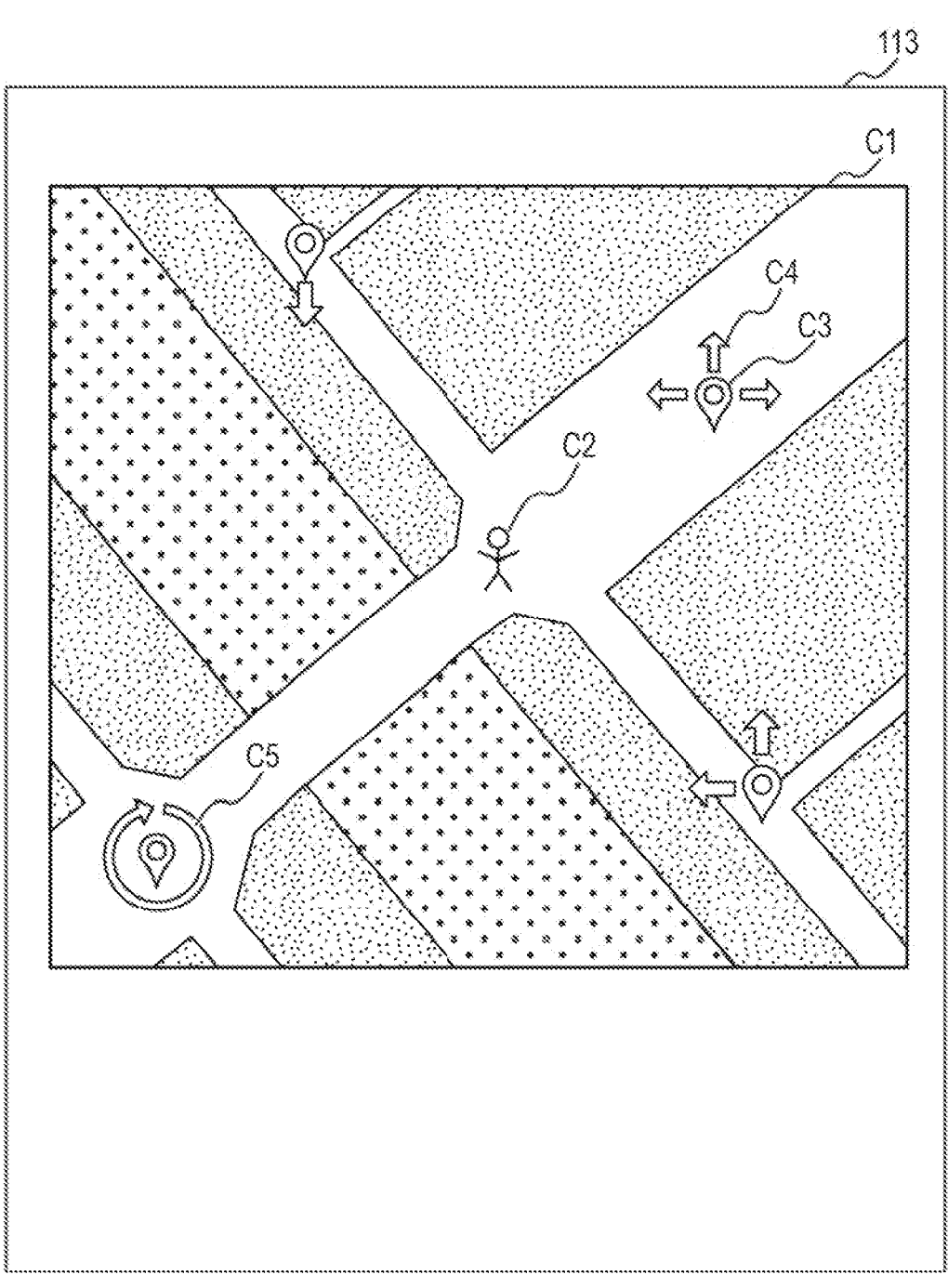
FIG. 8 is a front view of a display of a mobile terminal displaying peripheral information.

FIG. 8 is a front view of the display 113 of the mobile terminal 110 displaying peripheral information. In response to startup of an image display program according to the present example embodiment, the mobile terminal 110 transfers to a state of displaying peripheral information on the display 113 as illustrated in FIG. 8. The display 113 displays a map C1, a current marker C2, position markers C3, orientation markers C4, and a panorama marker C5 as peripheral information.

The map C1 is a map of a predetermined range about the current position of the mobile terminal 110 as the center. The current position of the mobile terminal 110 is acquired every predetermined time (for example, every 1 second) by using the GPS receiver 117. The map C1 may be a map stored in the memory 112 of the mobile terminal 110 or may be acquired at any time via the network 190. The current marker C2 is displayed at a point on the map C1 corresponding to the current position of the mobile terminal 110.

The position marker C3 is displayed at a point on the map C1 corresponding to the position of each past image. The past image is an image included in a predetermined range about the current position as the center out of past images pre-stored in the server 150. Furthermore, at least one orientation marker C4 indicating the orientation of the past image is displayed near respective position markers C3 of past images. When a past image having a plurality of orientations at a single position is stored, a plurality of orientation markers C4 may be displayed for a single position marker C3. In the present example embodiment, the orientation marker C4 has an arrow shape, and the pointing direction of the arrow corresponds to an orientation. The expression of an orientation by the orientation marker C4 is not limited thereto but may be a figure, a character, or a combination thereof. Further, when a panoramic image for 360 degrees is stored as a past image, the panorama marker C5 indicating the whole direction may be displayed instead of the orientation marker C4. While the panoramic marker C5 has a circular arrow shape in the present example embodiment, it may be any expression without being limited thereto. The position and the orientation of the past image are received at the mobile terminal 110 from the server 150 every predetermined time or at a timing when the current position changes.

Figure 9:
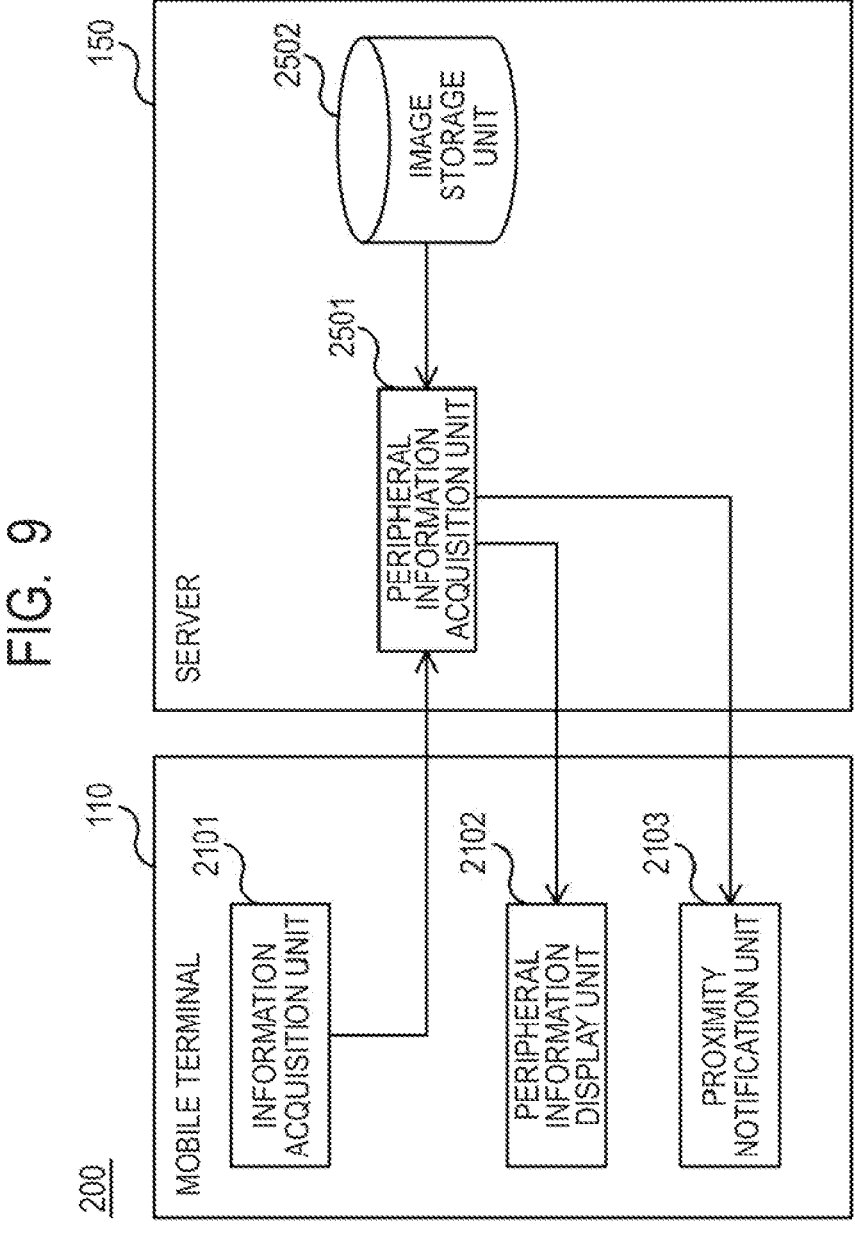
FIG. 9 is a block diagram of an image display system according to a second example embodiment.

FIG. 9 is a block diagram of the image display system 200 according to the present example embodiment. In FIG. 9, arrows represent main dataflows, and there may be other dataflows than those illustrated in FIG. 9. In FIG. 9, each block illustrates a configuration in a unit of function rather than in a unit of hardware (device).

The mobile terminal 110 has an information acquisition unit 2101, a peripheral information display unit 2102, and a proximity notification unit 2103. In the mobile terminal 210, the information acquisition unit 2101, the peripheral information display unit 2102, and the proximity notification unit 2103 are stored in the memory 112 as programs that can be executed by the processor 111, respectively. That is, when performing the image display method according to the present example embodiment, the processor 111 functions as the information acquisition unit 2101, the peripheral information display unit 2102, and the proximity notification unit 2103. At least a part of these functions may be implemented as an electric circuit instead of a program.

The server 150 has a peripheral information acquisition unit 2501 and an image storage unit 2502. In the server 150, the image acquisition unit 2502 is stored in the memory 152 or the storage device 153 as a program that can executed by the processor 151. Further, the image storage unit 2502 is a part of the memory 152 or the storage device 153. That is, when performing the image display method according to the present example embodiment, the processor 151 functions as the peripheral information acquisition unit 2501, and the memory 152 or the storage device 153 functions as the image storage unit 2502. At least a part of these functions may be implemented as an electric circuit instead of a program.

In response to the program of the image display method according to the present example embodiment being performed by the user, the information acquisition unit 2101 acquires the current position of the mobile terminal 110 (if necessary, in addition, the current orientation). The definition and the acquisition method of the position and the orientation are the same as those in the first example embodiment. The information acquisition unit 2101 then uses the mobile communication device 118 to transmit information including the acquired current position to the server 150. The information acquisition unit 2101 acquires the current position every predetermined time (for example, every 1 second) and transmits information including the acquired current position to the server 150 successively or at the timing of a change in the current position.

The image storage unit 2502 pre-stores past images and the positons and orientations of the past images. The image storage unit 2502 stores past images as image files that are electronic data. Each past image is provided with a unique identifier (for example, a file name). The image storage unit 2502 further stores the positions and the orientations of the past images and capturing time of past images as a table of a database, for example, in association with the identifiers of the past images.

The peripheral information acquisition unit 2501 extracts a past image(s) that is within a predetermined distance (for example, within 100 m) from the current position received from the mobile terminal 110 out of past images pre-stored in the image storage unit 2502 and acquires the identifier and the position and orientation of the extracted past image. The extraction criteria of the past image around the current position is not limited to the criterion of being within a predetermined distance, but any criteria that can indicate the past image being close to the current position such as a criterion of a predetermined number in ascending order, a criterion of being within the same block as the current position (for example, within the block having an address of the same street number), or the like may be used. The peripheral information acquisition unit 2501 transmits peripheral information including the identifier and the position and orientation of the extracted past image to the mobile terminal 110.

The peripheral information display unit 2102 uses the current position acquired by the information acquisition unit 2101 and the peripheral information received from the server 150 to display the peripheral information on the display 113. Specifically, as illustrated in FIG. 8, the peripheral information display unit 2102 displays the position marker C3 and the orientation marker C4 (or the panorama marker C5) indicating the position and orientation of the past image included in the peripheral information together with the current marker C2 indicating the current position on the map C1 read from the memory 112 or acquired via the network 190.

A single position marker C3 may be displayed for a single past image position, or a single position marker C3 may be displayed for a plurality of past image positions close to each other (for example, within 5 m). When a single position marker C3 is displayed for a plurality of past images, the center of gravity of the plurality of past image positions may be the position of the position marker C3. Further, a single orientation marker C4 may be displayed for a single past image orientation, or a single orientation marker C4 is displayed for a plurality of past image orientations close to each other (for example, within 90 degrees). When a plurality of past image orientations are gathered, for example, an arrow in the north direction may be used when the azimuth angle (the north direction is 0 degree) is greater than or equal to 0 degree and smaller than or equal to 45 degrees or the azimuth angle is greater than or equal to 315 degrees and smaller than 360 degrees, an arrow in the east direction may be used when the azimuth angle is greater than 45 degrees and smaller than 135 degrees, an arrow in the south direction may be used when the azimuth angle is greater than or equal to 135 degrees and smaller than 225 degrees, and an arrow in the west direction may be used when the azimuth angle is greater than or equal to 225 degrees and smaller than 315 degrees.

The proximity notification unit 2103 uses a peripheral information received from the server 150 to notify the user of proximity to a past image when there is a past image within a predetermined distance (for example, within 10 m) from the current position acquired from the information acquisition unit 2101. For example, the proximity notification unit 2103 uses an audio interface 121 to output a sound. The sound may include a beep sound, a music, a voice, or the like. As a method of notifying proximity to a past image, without being limited to a sound output, any method such as display on the display 113, light emission of a lamp, vibration of the main unit, or the like may be used.

At least one of display of peripheral information by the peripheral information display unit 2102 and notification of proximity by the proximity notification unit 2103 may be performed. Further, display of peripheral information by the peripheral information display unit 2102 and notification of proximity by the proximity notification unit 2103 may be performed in any order. For example, notification of proximity by the proximity notification unit 2103 may be performed during display of peripheral information by the peripheral information display unit 2102. Contrarily, display of peripheral information by the peripheral information display unit 2102 may be started after notification of proximity by the proximity notification unit 2103 is performed.

Figure 10:
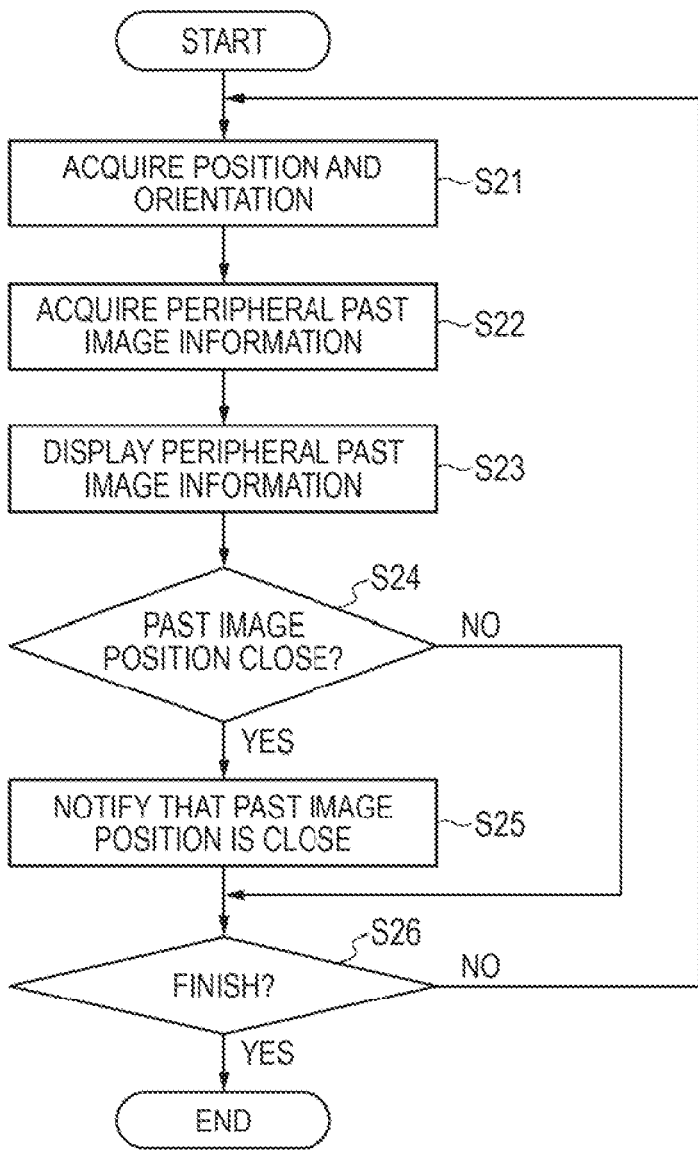
FIG. 10 is a diagram illustrating a flowchart of an image display method according to the second example embodiment.

FIG. 10 is a diagram illustrating a flowchart of an image display method according to the present example embodiment. The image display method is performed in cooperation with the mobile terminal 110 and the server 150. The image display method is started when a predetermined operation such as pressing of a button or the like on the mobile terminal 110 is detected, for example.

First, the information acquisition unit 2101 acquires a current position of the mobile terminal 110 by the GPS receiver 117 (step S21). The information acquisition unit 2101 uses the mobile communication device 118 to transmit information including the acquired current position to the server 150.

The peripheral information acquisition unit 2501 extracts a past image(s) that is within a predetermined distance (for example, within 100 m) from the current position received from the mobile terminal 110 out of past images pre-stored in the image storage unit 2502 and acquires the identifier and the position and orientation of the extracted past image (step S22). The peripheral information acquisition unit 2501 uses the communication interface to transmit peripheral information including the identifier and the position and orientation of the extracted past image to the mobile terminal 110.

The peripheral information display unit 2102 uses the current position acquired by step S21 and the peripheral information received from the server 150 to display the peripheral information on the display 113 (step S23). The peripheral information is displayed as illustrated in FIG. 8, for example.

If any of the past image positions included in the peripheral information received from the server 150 is within a predetermined distance (for example, within 10 m) from the current position acquired in step S21 (step S24, YES), the proximity notification unit 2103 uses the audio interface 121 to output a sound and notifies the user of proximity to the past image position (step S25).

If all the past image positions included in the peripheral information received from the server 150 are distant more than a predetermined distance from the current position acquired in step S21 (step S24, NO) or if no finish instruction is received from the user after the completion of step S25 (step S26, NO), the process returns to step S21 and is repeated. On the other hand, if a finish instruction is received from the user (step S26, YES), the process according to the present example embodiment ends.

The processor 111 of the mobile terminal 110 and the processor 151 of the server 150 are subjects of each step (process) included in the image display method illustrated in FIG. 10. That is, the processor 111 and the processor 151 read the program for executing the image display method illustrated in FIG. 10 from the memory 112, the memory 152, or the storage device 153, execute the program to control respective units of the mobile terminal 110 and the server 150, and thereby perform the image display method illustrated in FIG. 10.

The image display method according to the present example embodiment can be used in combination with the first example embodiment. In this case, when the user has moved to the past image position confirmed on a map according to the present example embodiment or when the user is notified of there being a past image nearby, display of the difference between a current image and a past image on the mobile terminal may be started by the image display method according to the first example embodiment. Alternatively, the image display method according to the present example embodiment may be performed alone.

According to the present example embodiment, the user can know a past image position around the current location by viewing a map displayed on the display 113 or receiving notification from the mobile terminal 110. This allows the user to positively move to a location where a past image is located and acquire a past image stored at the location or view the difference as described in the first example embodiment.

Third Example Embodiment

In the present example embodiment, information on an object included in a current image or a past image is displayed by using an object recognition technology. An image display system 300 according to the present example embodiment has the same device configuration as that of the first example embodiment.

Figure 11:
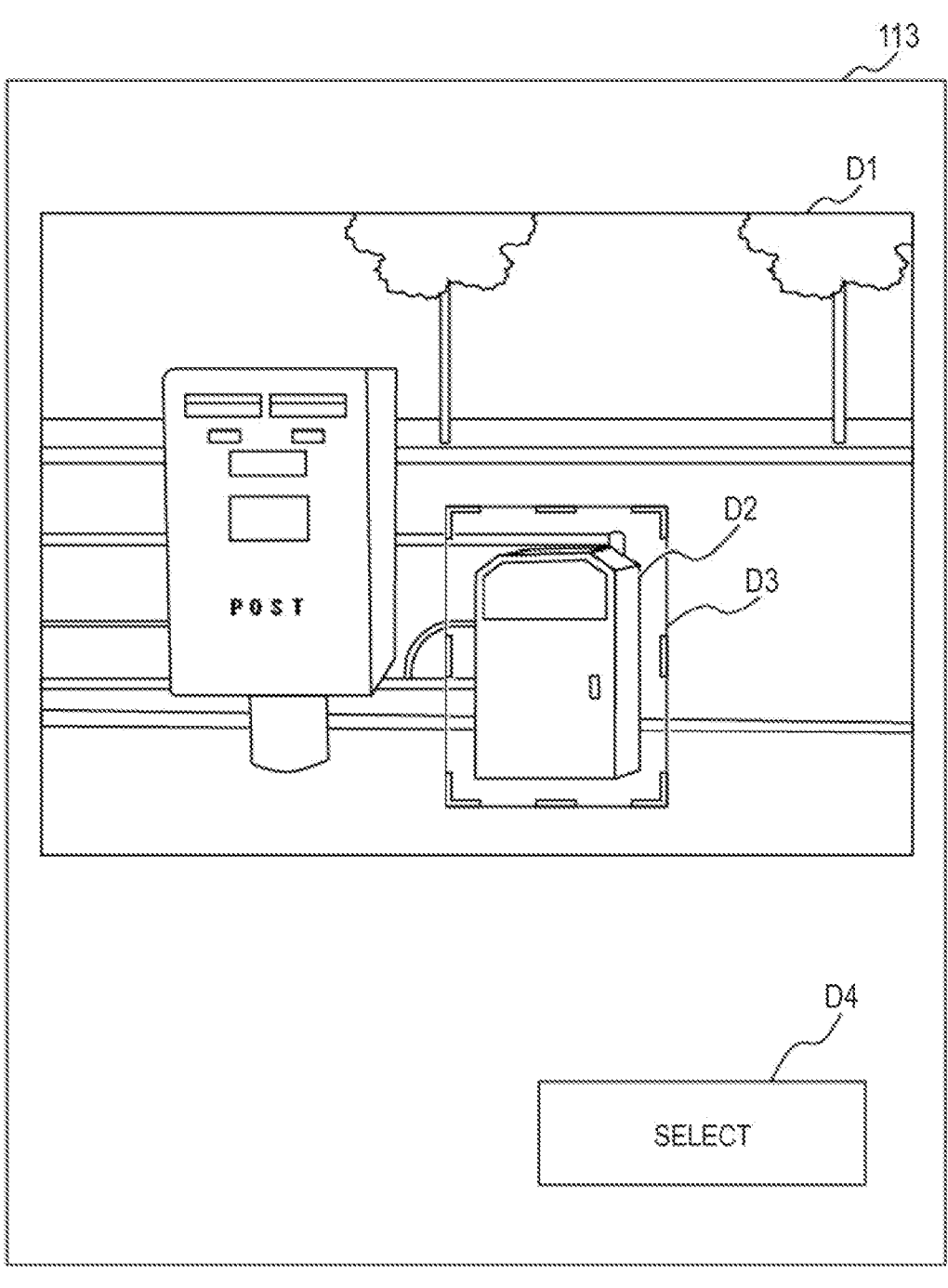
FIG. 11 is a front view of a display of a mobile terminal accepting region designation.

FIG. 11 is a front view of the display 113 of the mobile terminal 110 accepting region designation. In response to startup of an image display program according to the present example embodiment, the mobile terminal 110 transfers to a state of accepting region designation on the display 113 as illustrated in FIG. 11. The display 113 displays a past image D1, a frame D3 indicating a designated region, and a button D4 used for determining a region.

For example, the past image D1 is acquired by the image display method according to the first example embodiment and received from the server 150. The current image may be used instead of the past image D1. The frame D3 indicating a region to be designated as object recognition is displayed in the past image D1. The position and the size of the frame D3 can be changed in response to a user operation (for example, swipe on a touch panel). In the state of FIG. 11, the frame D3 is set so as to surround an object D2 in the past image D1.

The button D4 is a virtual button displayed on the display 113 and can be pressed by the user operating a touch panel or the like. In response to the button D4 being pressed by the user, the mobile terminal 110 transfers to a state of displaying an object recognition result on the display 113 as illustrated in FIG. 12.

Figure 12:
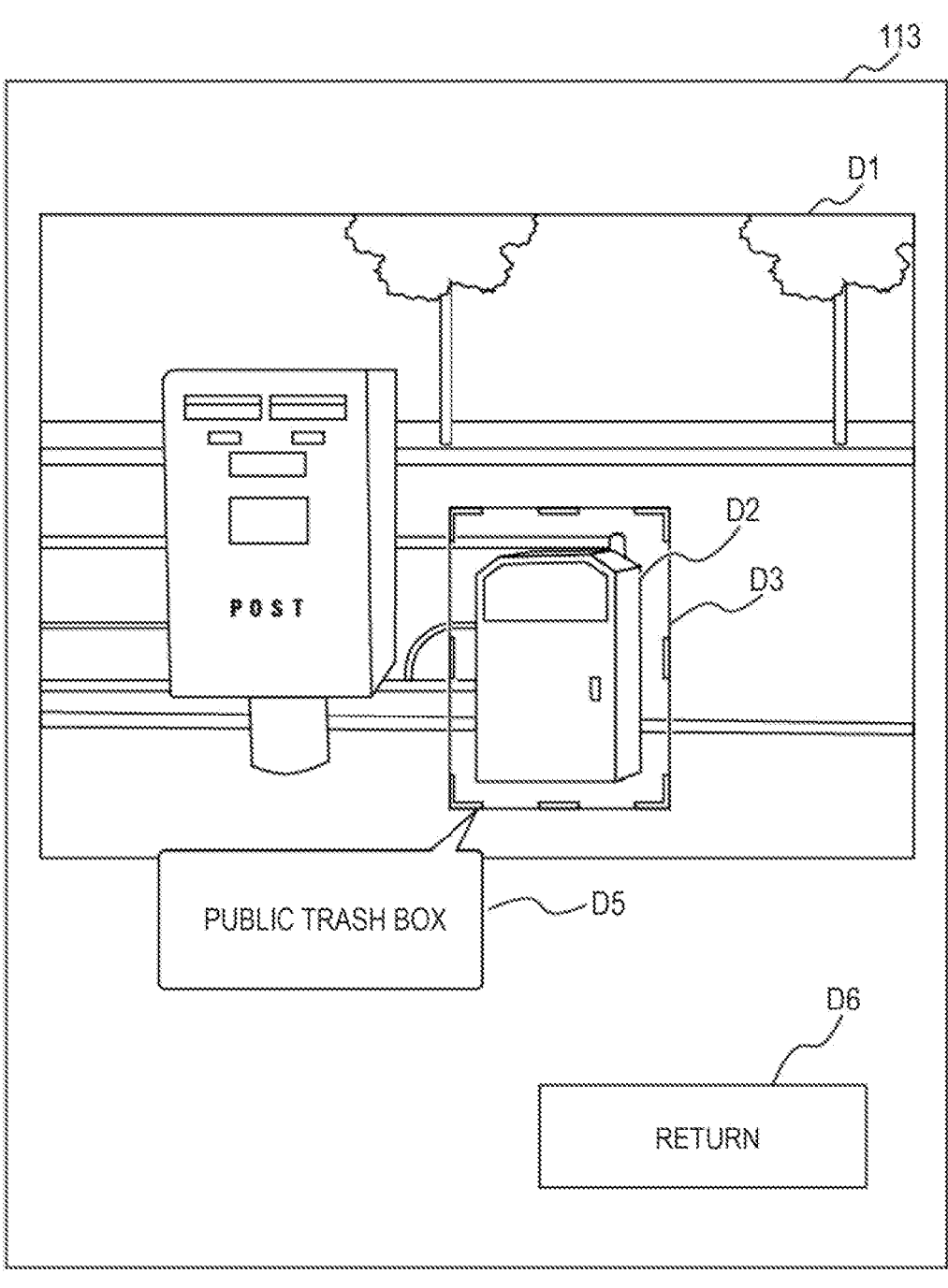
FIG. 12 is a front view of a display of a mobile terminal displaying an object recognition result.

FIG. 12 is a front view of the display 113 of the mobile terminal 110 displaying an object recognition result. The display 113 displays the past image D1, the frame D3 indicating a designated region, an object recognition result D5, and a button D6 used for returning to region determination. In a similar manner to FIG. 11, the current image may be used instead of the past image D1.

The object recognition result D5 determined by an object recognition method described later is displayed near the frame D3 indicating the region determined in FIG. 11. The object recognition result D5 includes a text of the name of the object. The object recognition result D5 indicating that the object D2 is a public trash box is displayed here. The object recognition result D5 may include any information on an object such as additional information on the object, an image of a similar object other than the name of the object, or the like.

The button D6 is a virtual button displayed on the display 113 and can be pressed by the user operating a touch panel or the like. In response to the button D6 being pressed by the user, the mobile terminal 110 again transfers to a state of accepting region designation on the display 113 as illustrated in FIG. 11.

Figure 13:
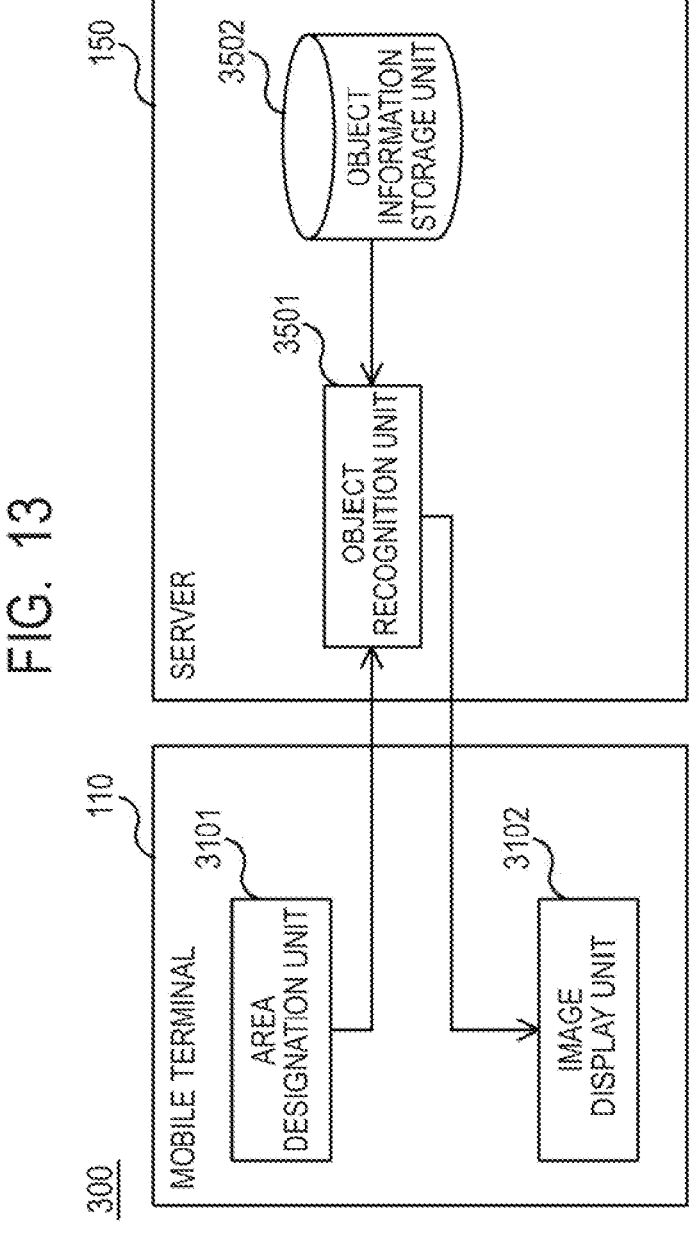
FIG. 13 is a block diagram of an image display system according to a third example embodiment.

FIG. 13 is a block diagram of the image display system 300 according to the present example embodiment. In FIG. 13, arrows represent main dataflows, and there may be other dataflows than those illustrated in FIG. 13. In FIG. 13, each block illustrates a configuration in a unit of function rather than in a unit of hardware (device).

The mobile terminal 110 has a region designation unit 3101 and an image display unit 3102. In the mobile terminal 110, the region designation unit 3101 and the image display unit 3102 are stored in the memory 112 as programs that can be executed by the processor 111, respectively. That is, when performing the image display method according to the present example embodiment, the processor 111 functions as the region designation unit 3101 and the image display unit 3102. At least a part of these functions may be implemented as an electric circuit instead of a program.

The server 150 has an object recognition unit 3501 and an object information storage unit 3502. In the server 150, the object recognition unit 3501 is stored in the memory 152 or the storage device 153 as programs that can executed by the processor 151. Further, the object information storage unit 3502 is a part of the memory 152 or the storage device 153. That is, when performing the image display method according to the present example embodiment, the processor 151 functions as the object recognition unit 3501, and the memory 152 or the storage device 153 functions as the object information storage unit 3502. At least a part of these functions may be implemented as an electric circuit instead of a program.

In response to the program of the image display method according to the present example embodiment being performed by the user, the region designation unit 3101 accepts designation of a region as a target of object recognition on a current image or a past image. When a region is determined by the user, the region designation unit 3101 transmits an image region that is a specified portion cut out from the current image or the past image to the server 150. Note that, when a storage unit for past images is provided in the server 150 that performs object recognition, the mobile terminal 110 is not required to transmit an image region to the server 150, and instead may transmit the position and the size of the designated region.

The object recognition unit 3501 uses a known object recognition method (for example, the method disclosed in Non Patent Literature 2) to perform recognition of an object included in the image region received from the mobile terminal 110. For example, first, the object recognition unit 3501 extracts feature information (edge or the like) from the image region received from the mobile terminal 110. Further, in addition to various object feature information, the name or additional information on the object is pre-stored in the object information storage unit 3502. The object recognition unit 3501 then compares the feature information extracted from the image region with the feature information stored in the object information storage unit 3502 and determines the object included in the image region according to a predetermined rule. The object recognition method according to the present example embodiment is not limited to a specific method, and any method that can recognize an object from an image may be used. The object recognition unit 3501 transmits an object recognition result including the name or the like of the determined object to the mobile terminal 110.

The object recognition unit 3501 may be provided in the mobile terminal 110 instead of in the server 150. In such a case, it is not necessary to transmit an image region itself from the mobile terminal 110 to the server 150, and it is necessary to transmit only the feature information extracted from the image region and the feature information on the object stored in the object information storage unit 3502. As a result, the traffic necessary for the image display method according to the present example embodiment can be reduced.

The image display unit 3102 displays the past image D1 (or the current image) and the frame D3 indicating a designated region and displays the object recognition result D5 received from the server 150 on the display 113 as illustrated in FIG. 12.

Figure 14:
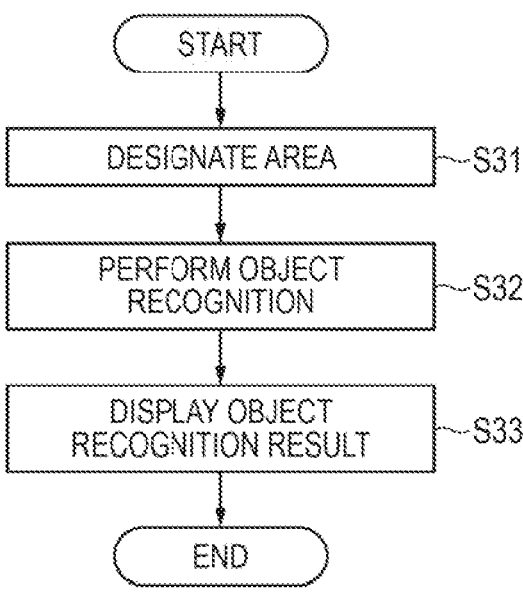
FIG. 14 is a diagram illustrating a flowchart of an image display method according to the third example embodiment.

FIG. 14 is a diagram illustrating a flowchart of the image display method according to the present example embodiment. The image display method is started when a predetermined operation such as pressing of a button or the like is detected on the mobile terminal 110, for example.

First, in response to the program of the image display method according to the present example embodiment being performed by the user, the region designation unit 3101 accepts designation of a region as a target of object recognition on a current image or a past image (step S31). When a region is determined by the user, the region designation unit 3101 uses the mobile communication device 118 to transmit an image region that is a specified portion cut out from the current image or the past image to the server 150.

The object recognition unit 3501 uses the object recognition method described above to perform recognition of an object included in the image region received from the mobile terminal 110 (step S32). The object recognition unit 3501 uses the communication interface to transmit an object recognition result including the name or the like of the determined object to the mobile terminal 110.

The image display unit 3102 displays the object recognition result received from the server 150 on the display 113 (step S33). The object recognition result is displayed as illustrated in FIG. 12, for example.

The processor 111 of the mobile terminal 110 and the processor 151 of the server 150 are subjects of each step (process) included in the image display method illustrated in FIG. 14. That is, the processor 111 and the processor 151 read the program for executing the image display method illustrated in FIG. 14 from the memory 112, the memory 152, or the storage device 153, execute the program to control respective units of the mobile terminal 110 and the server 150, and thereby perform the image display method illustrated in FIG. 14.

While an object recognition technology is applied to only the region designated by the user in a current image or a past image in the image display method according to the present example embodiment, the object recognition technology may be applied to the entire region in a current image or a past image without acceptance of designation from the user, and an object recognition result may be automatically displayed.

The image display method according to the present example embodiment can be used in combination with the first example embodiment. In this case, designation of a region to be a target for object recognition by the present example embodiment may be accepted after a difference between a current image and a past image is displayed on the mobile terminal by using the image display method according to the first example embodiment. Alternatively, a region including a difference between a current image and a past image determined by the first example embodiment may be automatically defined as a region to be a target of the object recognition, and the object recognition according to the present example embodiment may be performed thereon. Alternatively, the image display method according to the present example embodiment may be performed alone.

According to the present example embodiment, since information on an object included in a current image or a past image is acquired by using an object recognition technology, identification of a suspicious object can be easily performed. Further, when the present example embodiment is used in application of tourism, guide information such as description of an object included in a current image or a past image can be provided to the user.

Fourth Example Embodiment

In the present example embodiment, a past image is displayed according to a condition designated by the user. An image display system 400 according to the present example embodiment has the same device configuration as that in the first example embodiment.

Figure 15:
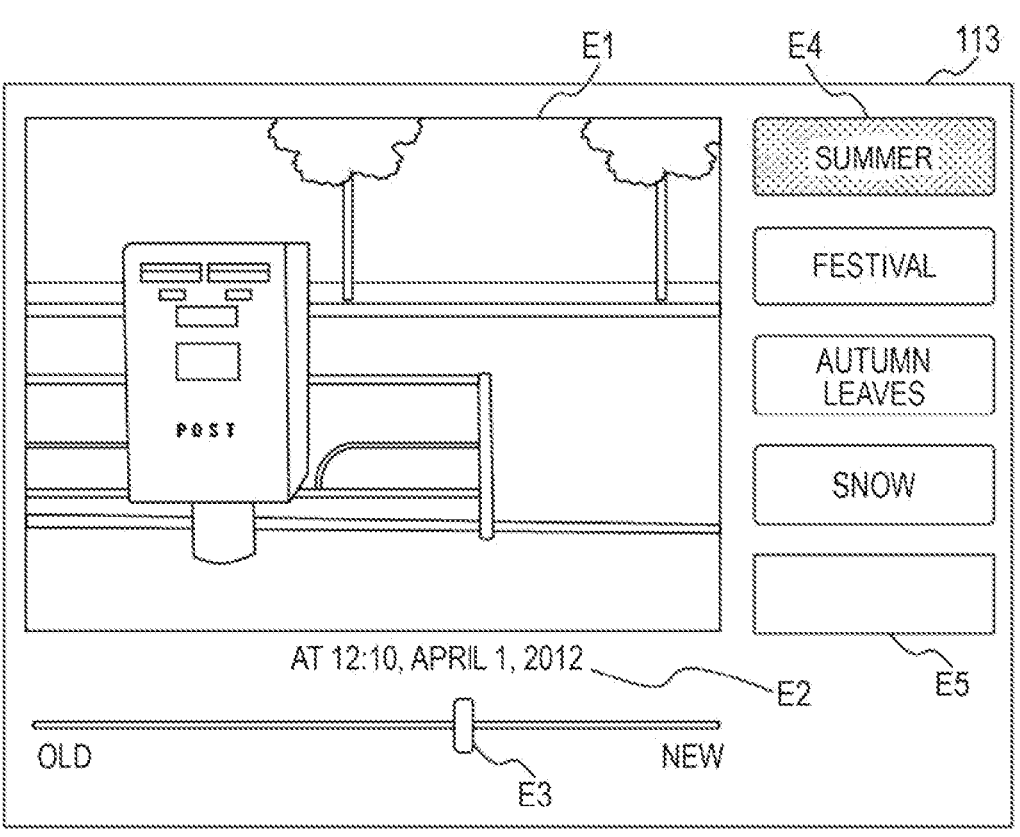
FIG. 15 is a front view of a display of a mobile terminal displaying a past image acquired in accordance with a designation condition.

FIG. 15 is a front view of the display 113 of the mobile terminal 110 displaying a past image acquired according to a designated condition. In response to startup of an image display program according to the present example embodiment, the mobile terminal 110 transfers to a state of displaying a condition designation part that accepts a condition designation of a past image to be displayed on the display 113 together with a past image as illustrated in FIG. 15. The display 113 displays, together with a past image E1 and a text E2 indicating the capturing time of the past image E1, a time designation part E3, a tug designation part E4, and a free entry part E5 as condition designation parts.

The past image E1 is a past image received from the server 150 and associated with the position and orientation similar to the current position and orientation. A selection method of the past image E1 will be described later. The text E2 indicating the capturing time of the past image E1 is received from the server 150 together with the past image E1.

The time designation part E3 is a virtual slide bar for designation of time displayed on the display 113 and can be operated on the touch panel or the like by the user. The time designation part E3 according to the present example embodiment includes a knob movable in a lateral direction, and the position of the knob corresponds to the current setting value. The knob positioned closer to the left end indicates older time, and the knob positioned closer to the right end indicates later time. A specific form of the time designation part E3 is not limited thereto, and it may be a form in which time is designated by a numeric value.

The tug designation part E4 is a virtual button used for tug designation displayed on the display 113 and can be pressed by the user operating the touch panel or the like. Texts indicating one or more tugs associated with pre-stored past images are listed in the tug designation part E4 as buttons. A predetermined number of tugs of past images stored in the server 150 are included in the tug designation part E4. Displayed tugs may be selected by any criteria, for example, a predetermined number of tugs may be displayed in descending order of the number of past images stored in the server 150, or a predetermined number of tugs associated with a past image close to the current location may be displayed.

The currently selected tug out of the tugs displayed in the tug designation part E4 is provided with a color different from that of other tugs (for example, "summer" is selected in FIG. 15). The free entry part E5 is a virtual entry field for tug designation displayed on the display 113 by which the user can enter a tug by operating a keyboard or the like. Thus, a tug which is not displayed on the tug designation part E4 can be designated from the free entry part E5.

When designated content of at least one of the time designation part E3, the tug designation part E4, and the free entry part E5 is changed by the user, the mobile terminal 110 acquires and displays a new past image E1 according to the designated content from the server 150.

Figure 16:
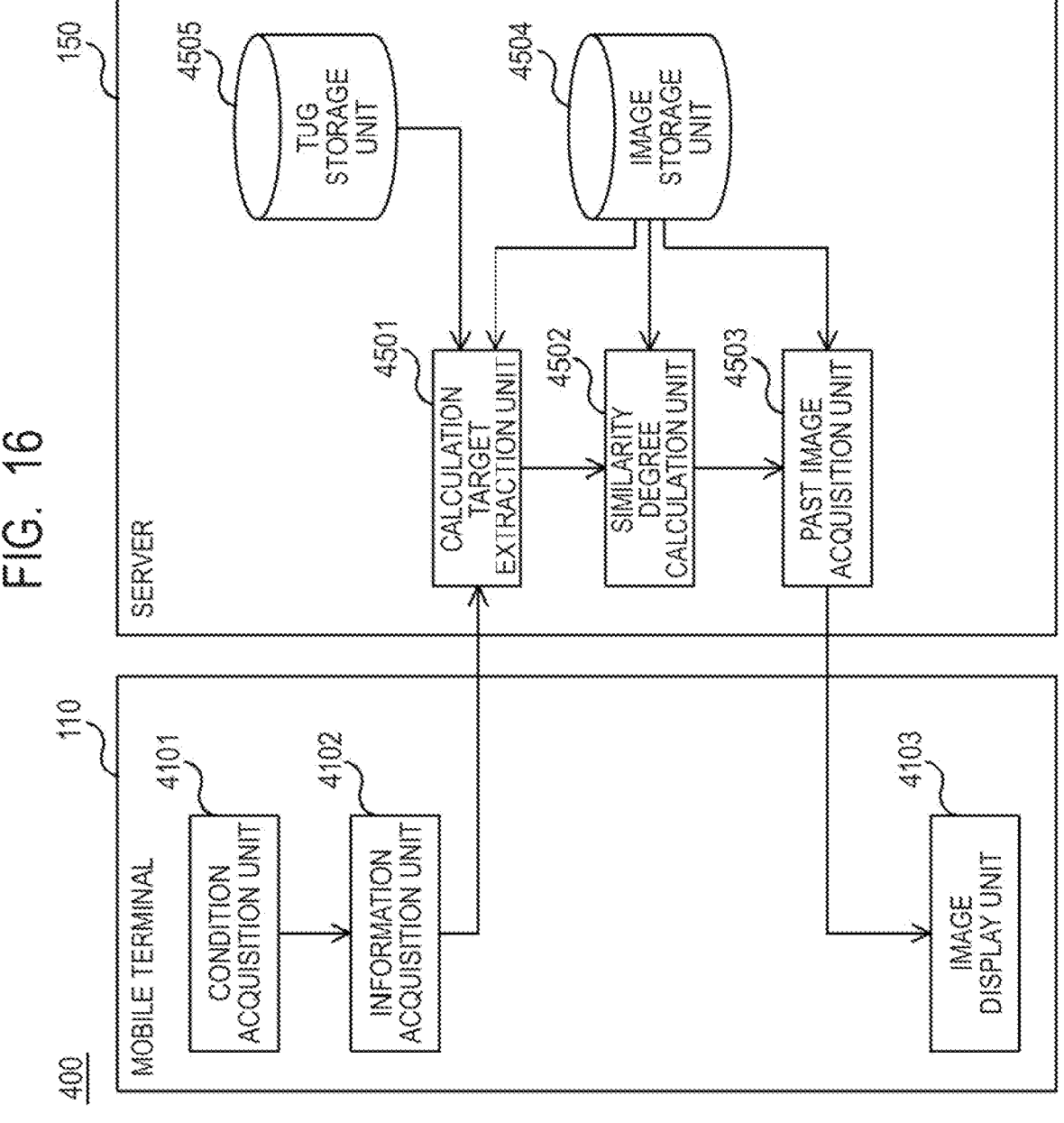
FIG. 16 is a block diagram of an image display system according to a fourth example embodiment.

FIG. 16 is a block diagram of the image display system 400 according to the present example embodiment. In FIG. 16, arrows represent main dataflows, and there may be other dataflows than those illustrated in FIG. 16. In FIG. 16, each block illustrates a configuration in a unit of function rather than in a unit of hardware (device).

The mobile terminal 110 has a condition acquisition unit 4101, an information acquisition unit 4102, and an image display unit 4103. In the mobile terminal 110, the condition acquisition unit 4101, the information acquisition unit 4102, and the image display unit 4103 are stored in the memory 112 as programs that can be executed by the processor 111, respectively. That is, when performing the image display method according to the present example embodiment, the processor 111 functions as the condition acquisition unit 4101, the information acquisition unit 4102, and the image display unit 4103. At least a part of these functions may be implemented as an electric circuit instead of a program.

The server 150 has a calculation target extraction unit 4501, a similarity degree calculation unit 4502, a past image acquisition unit 4503, an image storage unit 4504, and a tug storage unit 4505. In the server 150, the calculation target extraction unit 4501, the similarity degree calculation unit 4502, the past image acquisition unit 4503 are stored in the memory 152 or the storage device 153 as programs that can executed by the processor 151. Further, the image storage unit 4504 and the tug storage unit 4505 are a part of the memory 152 or the storage device 153. That is, when performing the image display method according to the present example embodiment, the processor 151 functions as the calculation target extraction unit 4501, the similarity degree calculation unit 4502, the past image acquisition unit 4503, and the memory 152 or the storage device 153 functions as the image storage unit 4504 and the tug storage unit 4505. At least a part of these functions may be implemented as an electric circuit instead of a program.

In response to at least one of a time and a tug being designated (or the designation is changed) by the user, the condition acquisition unit 4101 acquires a designation condition of the time and the tug. The designation condition may be a text representing the time and the tug itself or may be a code value associated with the time and the tug.

The information acquisition unit 4102 acquires the current position and orientation of the mobile terminal 110. The definition and the acquisition method of a position and an orientation are the same as those in the first example embodiment. The information acquisition unit 4102 then uses the mobile communication device 118 to transmit information including the acquired designated condition and the current position and orientation to the server 150.

The image storage unit 4504 pre-stores past images and the positons and orientations of the past images. The image storage unit 4504 stores past images as image files that are electronic data. Each past image is provided with a unique identifier (for example, a file name). The image storage unit 4504 further stores the positions and the orientations of the past images and capturing time of past images as a table of a database, for example, in association with the identifiers of the past images.

The tug storage unit 4505 stores tugs for respective past images stored in the image storage unit 4504. The tug storage unit 4505 stores tugs for past images in association with the identifiers of the past images as a table of a database, for example. A tug is a text briefly describing the content of a past image, which may be "summer", "festival", "autumn leaves", or the like as illustrated in FIG. 15, for example.

Storage of a tug for a past image may be performed at the same time as storage of the past image in the image storage unit 4504 or may be successively performed after storage of the past image. A tug for a past image may be manually input by the user or may be automatically determined. For automatic determination of a tug, it is possible to extract an object in a past image by using the object recognition technology of the third example embodiment, for example, and automatically determine a tug related to the extracted object as a tug for the past image. When a maple tree whose leaves have turned red is included in a past image, for example, a text "autumn leaves" can be determined as a tug for the past image. Further, a plurality of tugs may be associated with a single past image.

The calculation target extraction unit 4501 extracts a past image whose similarity degree S is to be calculated from the image storage unit 4505 based on a tug of the designated condition received from the mobile terminal 110. Specifically, first, the calculation target extraction unit 4501 acquires an identifier of a past image associated with a tug of the designated condition from the tug storage unit 4505. The calculation target extraction unit 4501 then extracts a past image (and the position and the orientation thereof) associated with the identifier from the image storage unit 4504 as a calculation target for the similarity degree S.

The similarity degree calculation unit 4502 uses the current position and orientation received from the mobile terminal 110 and the position and orientation of the past image extracted by the calculation target extraction unit 4501 to calculate the similarity degree S indicating resemblance therebetween based on predetermined calculation criteria. The specific calculation method of the similarity degree S is the same as that in the first example embodiment.

The past image acquisition unit 4503 selects and acquires any of the past images from the image storage unit 4504 based on the similarity degree S calculated by the similarity degree calculation unit 4502 and the time of the designated condition received from the mobile terminal 110. For example, the past image acquisition unit 4503 selects a past image closest to the time of the designated time out of past images having the similarity degree S below a predetermined threshold. Alternatively, the past image acquisition unit 4503 may use a numeric value of a difference between the time of the past image and the time of the designated condition to weight the similarity degree S and select the past image having the smallest weighted similarity degree S. The past image acquisition unit 4503 then uses the communication interface to transmit the selected past image to the mobile terminal 110.

The image display unit 4103 displays the past image received from the serer 150 on the display 113 as illustrated in FIG. 15.

The image display method according to the present example embodiment can be used in combination with the first example embodiment. In this case, a past image acquired according to a condition designated by the user may be used to start display of the difference between a current image and a past image by the image display method according to the first example embodiment. Alternatively, the image display method according to the present example embodiment may be performed alone.

While both of a time and a tug are used as an acquisition condition of a past image in the image display method according to the present example embodiment, at least one of a time and a tug may be used as an acquisition condition of a past image.

According to the present example embodiment, since a past image is acquired according to a tug or a time designated by the user, this enables the user to designate and view a past image that matches desired content or time.

Figure 17:
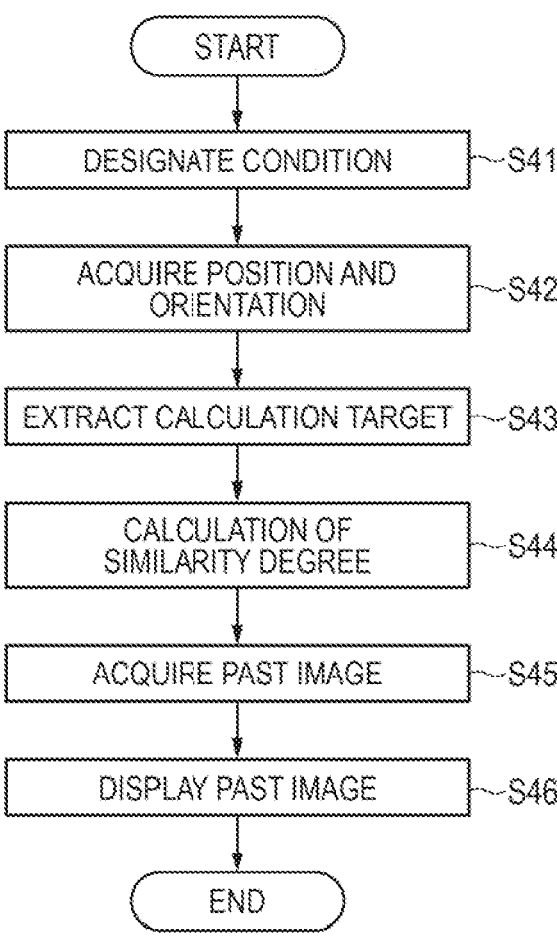
FIG. 17 is a diagram illustrating a flowchart of an image display method according to the fourth example embodiment.

FIG. 17 is a diagram illustrating a flowchart of an image display method according to the present example embodiment. The image display method is performed in cooperation with the mobile terminal 110 and the server 150. The image display method is started when a predetermined operation such as pressing of a button is detected on the mobile terminal 110, for example.

First, the condition acquisition unit 4101 acquires a designation condition of a time and a tug designated by the user (step S41). Next, the information acquisition unit 4102 acquires the current position of the mobile terminal 110 by using the GPS receiver 117 and acquires the current orientation of the mobile terminal 110 by using the electronic compass 116 (step S42). The information acquisition unit 4102 uses the mobile communication device 118 to transmit information including the acquired current position and orientation to the server 150. The order of step S41 and step S42 may be opposite or may be performed in parallel.

The calculation target extraction unit 4501 extracts a past image whose similarity degree S is to be calculated from the image storage unit 4504 based on the tug of the designated condition received from the mobile terminal 110 and tug information stored in the tug storage unit 4505 (step S43). The similarity degree calculation unit 4502 uses the current position and orientation received from the mobile terminal 110 to calculate the similarity degree S for each past image extracted by step S43 based on Equation (1) described above, for example (step S44).

The past image acquisition unit 4503 acquires, from the image storage unit 4504, one past image having the smallest similarity degree S out of past images whose similarity degrees S have been calculated in step S44 (step S45). The past image acquisition unit 4503 uses the communication interface to transmit the acquired past image to the mobile terminal 110.

The image display unit 4103 displays the past image received from the serer 150 on the display 113 (step S46).

The processor 111 of the mobile terminal 110 and the processor 151 of the server 150 are subjects of each step (process) included in the image display method illustrated in FIG. 17. That is, the processor 111 and the processor 151 read the program for executing the image display method illustrated in FIG. 17 from the memory 112, the memory 152, or the storage device 153, execute the program to control respective units of the mobile terminal 110 and the server 150, and thereby perform the image display method illustrated in FIG. 17.

Other Example Embodiments

Figure 18:
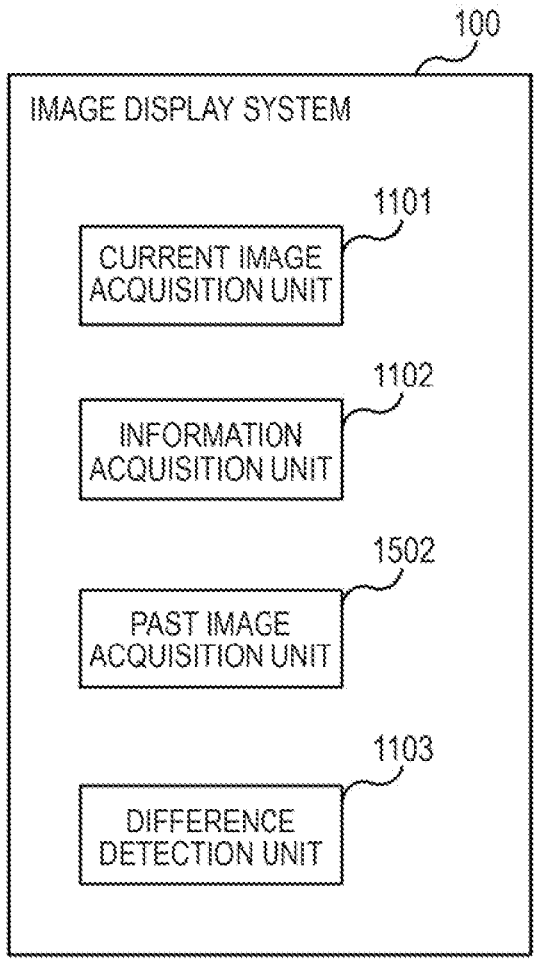
FIG. 18 is a general configuration diagram of an image display system according to each example embodiment.

FIG. 18 is a schematic configuration diagram of the image display system 100 according to respective example embodiments described above. FIG. 18 illustrates a configuration example for the image display system 100 to implement the function of displaying an image stored in the past based on the position and orientation of a mobile terminal. The image display system 100 has the current image acquisition unit 1101 as a first image acquisition unit that acquires a first image captured by a mobile terminal; the information acquisition unit 1102 that acquires information including a position and an orientation of the mobile terminal that has captured the first image; the past image acquisition unit 1502 as a second image acquisition unit that acquires a second image based on the position and the orientation of the mobile terminal and a position and an orientation associated with a second image stored in the past in a storage device; and the difference detection unit 1103 that detects a difference between the first image and the second image.

The present invention is not limited to the example embodiments described above and can be properly changed within a scope not departing from the spirit of the present invention.

Further, the scope of each of the example embodiments includes a processing method that stores, in a storage medium, a program causing the configuration of each of the example embodiments to operate so as to realize the function of each of the example embodiments described above (more specifically, a program causing a computer to perform the method illustrated in FIG. 7, FIG. 10, FIG. 14, or FIG. 17), reads the program stored in the storage medium as a code, and executes the program in a computer. That is, the scope of each of the example embodiments also includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a CD-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An image display system comprising:

a first image acquisition unit configured to acquire a first image captured by a mobile terminal;

an information acquisition unit configured to acquire information including a position and an orientation of the mobile terminal that has captured the first image;

a second image acquisition unit configured to, based on the position and the orientation of the mobile terminal and a position and an orientation associated with a second image stored in the past in a storage device, acquire the second image; and a difference detection unit configured to detect a difference between the first image and the second image.

(Supplementary note 2)

The image display system according to supplementary note 1 further comprising an image display unit configured to display the difference in addition to at least one of the first image and the second image.

(Supplementary Note 3)

The image display system according to supplementary note 2, wherein the image display unit displays a frame surrounding a region including the difference on the first image and the second image.

(Supplementary Note 4)

The image display system according to any one of supplementary notes 1 to 3, wherein the position and the orientation associated with the second image are a position and an orientation of a captured range of the second image.

(Supplementary Note 5)

The image display system according to any one of supplementary notes 1 to 4 further comprising a similarity degree calculation unit configured to calculate a similarity degree indicating resemblance of the position and the orientation of the mobile terminal to the position and the orientation associated with the second image, wherein the second image acquisition unit acquires the second image based on the similarity degree.

(Supplementary Note 6)

The image display system according to any one of supplementary notes 1 to 5 further comprising:

the mobile terminal having the first image acquisition unit and the information acquisition unit; and a server having the second image acquisition unit, wherein the difference detection unit is provided either in the mobile terminal or the server.

(Supplementary Note 7)

The image display system according to any one of supplementary notes 1 to 6 further comprising a peripheral information display unit configured to display the position associated with the second image present within a predetermined distance from the position of the mobile terminal on a map.

(Supplementary Note 8)

The image display system according to any one of supplementary notes 1 to 7 further comprising a proximity notification unit configured to perform notification when the second image is present within a predetermined distance from the position of the mobile terminal.

(Supplementary Note 9)

The image display system according to any one of supplementary notes 1 to 8 further comprising an object recognition unit configured to recognize an object included in the first image and the second image and output information on the object.

(Supplementary Note 10)

The image display system according to any one of supplementary notes 1 to 9 further comprising a condition acquisition unit configured to acquire a condition designated by a user of the mobile terminal, wherein the second image acquisition unit acquires the second image based on the designated condition in addition to the position and the orientation of the mobile terminal and the position and orientation associated with the second image.

(Supplementary Note 11)

A terminal comprising:

a first image acquisition unit configured to acquire a first image captured;

an information acquisition unit configured to acquire information including a position and an orientation; and a difference detection unit configured to receive a second image acquired based on the position and the orientation and a position and an orientation associated with the second image stored in the past in a storage device and detect a difference between the first image and the second image.

(Supplementary Note 12)

A method comprising:

acquiring a first image captured by a mobile terminal;

acquiring information including a position and an orientation of the mobile terminal that has captured the first image;

based on the position and the orientation of the mobile terminal and a position and an orientation associated with a second image stored in the past in a storage device, acquiring the second image; and detecting a difference between the first image and the second image.

(Supplementary Note 13)

A program configured to cause a computer to execute:

acquiring a first image captured by a mobile terminal;

acquiring information including a position and an orientation of the mobile terminal that has captured the first image;

based on the position and the orientation of the mobile terminal and a position and an orientation associated with a second image stored in the past in a storage device, acquiring the second image; and detecting a difference between the first image and the second image.

The invention claimed is:

1. An image display device comprising:

at least one memory configured to store computer program code; and at least one processor configured to execute the computer program code to:

acquire a current position of a mobile terminal from the mobile terminal;

display tags for designation of contents of a past image;

acquire, from the mobile terminal, a designated condition designated by a user of the mobile terminal and which includes one of the tags for designation of the contents of the past image;

acquire the past image which is associated with the current position and the designated condition in response to a user operation on the mobile terminal, based on the one of the tags of the designated condition acquired from the mobile terminal;

display the past image; and use the contents which represent at least any one of a season, an event, and a state of vegetation, wherein displaying the tags comprises displaying a first tag representing the season, a second tag representing the event, a third tag representing the state of vegetation, and a fourth tag indicating snow.

2. The image display device according to claim 1, wherein the at least one processor further configured to execute the computer program code to acquire the designated condition which includes a capturing time of the past image.

3. The image display device according to claim 2, wherein the at least one processor further configured to execute the computer program code to display a slide bar for designation of the capturing time.

4. The image display device according to claim 1, wherein the at least one processor is further configured to execute the computer program code to:

acquire a current orientation of the mobile terminal from the mobile terminal; and acquire the past image which is associated with the current orientation.

5. The image display device according to claim 1, wherein the at least one processor is further configured to execute the computer program code to associate the tags with the past image by extracting an object from the past image.

6. The image display device according to claim 1, wherein the season is at least one of spring, summer, winter, and autumn, wherein the event is indicated by the second tag as a festival, wherein the state of vegetation is indicated by the third tag as autumn leaves.

7. An image display method performed by a computer and comprising:

acquiring a current position of a mobile terminal from the mobile terminal;

displaying tags for designation of contents of a past image;

acquiring, from the mobile terminal, a designated condition designated by a user of the mobile terminal and which includes one of the tags for designation of the contents of the past image;

acquiring the past image which is associated with the current position and the designated condition in response to a user operation on the mobile terminal, based on the one of the tags of the designated condition acquired from the mobile terminal;

displaying the past image; and using the contents which represent at least any one of a season, an event, and a state of vegetation, wherein displaying the tags comprises displaying a first tag representing the season, a second tag representing the event, a third tag representing the state of vegetation, and a fourth tag indicating snow.

8. A non-transitory computer-readable storage medium storing a program that causes a computer to perform:

acquiring a current position of a mobile terminal from the mobile terminal;

displaying tags for designation of contents of a past image;

acquiring, from the mobile terminal, a designated condition designated by a user of the mobile terminal and which includes one of the tags for designation of the contents of the past image;

acquiring the past image which is associated with the current position and the designated condition in response to a user operation on the mobile terminal, based on the one of the tags of the designated condition acquired from the mobile terminal;

displaying the past image; and using the contents which represent at least any one of a season, an event, and a state of vegetation, wherein displaying the tags comprises displaying a first tag representing the season, a second tag representing the event, and a third tag representing the state of vegetation, and a fourth tag indicating snow.

* * * * *